United States Patent
Koide et al.

(10) Patent No.: US 7,203,035 B2
(45) Date of Patent: Apr. 10, 2007

(54) THIN-FILM MAGNETIC HEAD HAVING A SHEET-SHAPED HEATER WITH A LEAD PART CONNECTED IN SERIES WITH THE HEATER AND HAVING A RESISTANCE LOWER THAN THE HEATER

(75) Inventors: Soji Koide, Chuo-ku (JP); Nobuya Oyama, Chuo-ku (JP); Norikazu Ota, Chuo-ku (JP); Tetsuro Sasaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 421 days.

(21) Appl. No.: 10/820,857

(22) Filed: Apr. 9, 2004

(65) Prior Publication Data

US 2004/0201920 A1    Oct. 14, 2004

(30) Foreign Application Priority Data

Apr. 14, 2003  (JP)  ............................. 2003-109406
Jan. 27, 2004  (JP)  ............................. 2004-018856

(51) Int. Cl.
G11B 5/56    (2006.01)

(52) U.S. Cl. .................................... 360/294.7; 360/128
(58) Field of Classification Search .............. 360/294.7
See application file for complete search history.

(56) References Cited

U.S. PATENT DOCUMENTS 5,991,113 A * 11/1999 Meyer et al. ............. 360/234.7
6,493,183 B1 * 12/2002 Kasiraj et al. .............. 360/126
6,956,716 B2 * 10/2005 Lille .......................... 360/126

FOREIGN PATENT DOCUMENTS

| JP | A-05-020635 | 1/1993 |
| JP | A-2000-260825 | 9/2000 |
| JP | A-2002-056952 | 2/2002 |

* cited by examiner

*Primary Examiner*—A. J. Heinz
(74) *Attorney, Agent, or Firm*—Oliff and Berridge, PLC

(57) ABSTRACT

A thin-film magnetic head has at least either an electromagnetic transducer or a magnetoresistive device, and a sheet-shaped heater for generating heat when energized. The heater has a heating part and a lead part connected in series to the heating part. The lead part has a sheet resistance lower than that of the heating part.

13 Claims, 16 Drawing Sheets

Fig.15

| | MATERIAL FOR HP & BP | RESISTIVITY OF HP & BP: ρ1 [μΩ·cm] | THICKNESS OF HP & BP: d1 [nm] | SHEET RESISTANCE OF HP & BP: SR1 [Ω] | MATERIAL FOR ACL | RESISTIVITY OF ACL: ρ2 [μΩ·cm] | THICKNESS OF ACL: d2 [nm] | SHEET RESISTANCE OF ACL: SR2 [Ω] | SR2/SR1 [−] | SHEET RESISTANCE OF LP: SR3 [Ω] | RESISTANCE OF HP [Ω] | TOTAL RESISTANCE OF LP [Ω] | HP'S POWER CONSUMPTION / TOTAL POWER CONSUMPTION [%] |
|---|---|---|---|---|---|---|---|---|---|---|---|---|---|
| COMP.EX1 | NiFe | 23 | 150 | 1.53 | − | − | − | − | − | 1.53 | 26.1 | 12.3 | 68.0 |
| EX.1 | NiFe | 23 | 150 | 1.53 | NiFe | 23.0 | 100 | 2.30 | 1.50 | 0.92 | 26.1 | 7.4 | 78.0 |
| EX.2 | NiFe | 23 | 150 | 1.53 | NiFe | 23.0 | 200 | 1.15 | 0.75 | 0.66 | 26.1 | 5.3 | 83.2 |
| EX.3 | NiFe | 23 | 150 | 1.53 | CoFe | 20.0 | 93 | 2.15 | 1.40 | 0.90 | 26.1 | 7.2 | 78.4 |
| EX.4 | NiFe | 23 | 150 | 1.53 | CoFe | 20.0 | 100 | 2.00 | 1.30 | 0.87 | 26.1 | 6.9 | 79.0 |
| EX.5 | NiFe | 23 | 150 | 1.53 | CoFe | 20.0 | 108.5 | 1.84 | 1.20 | 0.84 | 26.1 | 6.7 | 79.6 |
| EX.6 | NiFe | 23 | 150 | 1.53 | CoFe | 20.0 | 131 | 1.53 | 1.00 | 0.77 | 26.1 | 6.1 | 81.0 |
| EX.7 | NiFe | 23 | 150 | 1.53 | CoFe | 20.0 | 162 | 1.23 | 0.81 | 0.68 | 26.1 | 5.5 | 82.7 |
| EX.8 | NiFe | 23 | 150 | 1.53 | CoFe | 20.0 | 200 | 1.00 | 0.65 | 0.61 | 26.1 | 4.8 | 84.3 |
| EX.9 | NiFe | 23 | 150 | 1.53 | Mo | 16.0 | 100 | 1.60 | 1.04 | 0.78 | 26.1 | 6.3 | 80.6 |
| EX.10 | NiFe | 23 | 150 | 1.53 | Mo | 16.0 | 173 | 0.92 | 0.60 | 0.58 | 26.1 | 4.6 | 85.0 |
| EX.11 | NiFe | 23 | 150 | 1.53 | Mo | 16.0 | 200 | 0.80 | 0.52 | 0.53 | 26.1 | 4.2 | 86.1 |
| EX.12 | NiFe | 23 | 150 | 1.53 | Mo | 16.0 | 255 | 0.63 | 0.41 | 0.45 | 26.1 | 3.6 | 88.0 |
| EX.13 | NiFe | 23 | 150 | 1.53 | Rh | 17.5 | 100 | 1.75 | 1.14 | 0.82 | 26.1 | 6.5 | 79.9 |
| EX.14 | NiFe | 23 | 150 | 1.53 | Rh | 17.5 | 200 | 0.88 | 0.57 | 0.56 | 26.1 | 4.5 | 85.4 |
| EX.15 | NiFe | 23 | 150 | 1.53 | Au | 3.5 | 100 | 0.35 | 0.23 | 0.28 | 26.1 | 2.3 | 92.0 |
| EX.16 | NiFe | 23 | 150 | 1.53 | Au | 3.5 | 200 | 0.18 | 0.11 | 0.16 | 26.1 | 1.3 | 95.4 |
| EX.17 | NiFe | 23 | 150 | 1.53 | Cu | 3.0 | 100 | 0.30 | 0.20 | 0.25 | 26.1 | 2.0 | 92.9 |
| EX.18 | NiFe | 23 | 150 | 1.53 | Cu | 3.0 | 200 | 0.15 | 0.10 | 0.14 | 26.1 | 1.1 | 96.0 |

HP:HEATING PART    BP:BASE PART    ACL:ADDITIONAL CONDUCTIVE LAYER    LP:LEAD PART

Fig.16

| | MATERIAL FOR HP & BP | RESISTIVITY OF HP & BP ρ1 [μΩ·cm] | THICKNESS OF HP & BP d1 [nm] | SHEET RESISTANCE OF HP & BP: SR1 [Ω] | MATERIAL FOR ACL | RESISTIVITY OF ACL ρ2 [μΩ·cm] | THICKNESS OF ACL d2 [nm] | SHEET RESISTANCE OF ACL: SR2 [Ω] | SR2/SR1 [—] | SHEET RESISTANCE OF LP: SR3 [Ω] | RESISTANCE OF HP [Ω] | TOTAL RESISTANCE OF LP [Ω] | HP'S POWER CONSUMPTION / TOTAL POWER CONSUMPTION [%] |
|---|---|---|---|---|---|---|---|---|---|---|---|---|---|
| COMP. EX.2 | CoFe | 20 | 150 | 1.33 | — | — | — | — | — | 1.33 | 22.7 | 10.7 | 68.0 |
| EX.19 | CoFe | 20 | 150 | 1.33 | CoFe | 20.0 | 100 | 2.00 | 1.50 | 0.80 | 22.7 | 6.4 | 78.0 |
| EX.20 | CoFe | 20 | 150 | 1.33 | Rh | 17.5 | 100 | 1.75 | 1.31 | 0.76 | 22.7 | 6.1 | 78.9 |
| EX.21 | CoFe | 20 | 150 | 1.33 | Mo | 16.0 | 100 | 1.60 | 1.20 | 0.73 | 22.7 | 5.8 | 79.6 |
| EX.22 | CoFe | 20 | 150 | 1.33 | Au | 3.5 | 100 | 0.35 | 0.26 | 0.28 | 22.7 | 2.2 | 91.1 |
| EX.23 | CoFe | 20 | 150 | 1.33 | Cu | 3.0 | 100 | 0.30 | 0.23 | 0.24 | 22.7 | 2.0 | 92.0 |

HP:HEATING PART  BP:BASE PART  ACL:ADDITIONAL CONDUCTIVE LAYER  LP:LEAD PART

THIN-FILM MAGNETIC HEAD HAVING A SHEET-SHAPED HEATER WITH A LEAD PART CONNECTED IN SERIES WITH THE HEATER AND HAVING A RESISTANCE LOWER THAN THE HEATER

BACKGROUND OF THE INVENTION

1. Field of the Invention

The present invention relates to a thin-film magnetic head, a head gimbal assembly, and a hard disk drive.

2. Related Background Art

Thin-film magnetic heads with electromagnetic transducers for writing and magnetoresistive devices for reading have been configured so as to levitate from hard disks, which are recording media, when writing or reading data to or from hard disk drives. Specifically, a thin-film magnetic head is mounted to a gimbal, which is attached to a leading end of a suspension arm, to constitute a head gimbal assembly (HGA). As the hard disk rotates, air flows under the thin-film magnetic head, so as to flex the suspension arm, thereby levitating the head.

The gap between the thin-film magnetic head and the hard disk, i.e., the head levitation amount, has been decreasing from 20 nm to 15 nm, and further to 10 nm as the hard disk has been attaining a higher recording density. A technique for reducing the head levitation amount is disclosed in Japanese Patent Application Laid-Open No. HEI 5-20635.

SUMMARY OF THE INVENTION

For attaining a higher recording density, the distance between the electromagnetic transducer or the magnetoresistive device in the thin-film magnetic head and the recording medium is required to be shorter.

It is an object of the present invention to provide a thin-film magnetic head, a head gimbal assembly and a hard disk drive for reducing the distance between the electromagnetic transducer or the magnetoresistive device in the thin-film magnetic head and a recording medium.

In one aspect, the present invention relates to a thin-film magnetic head. The thin-film magnetic head comprises at least either an electromagnetic transducer or a magnetoresistive device, and a sheet-shaped heater for generating heat when energized. The heater has a heating part with a predetermined sheet resistance and a lead part which is connected in series to the heating part and has a sheet resistance lower than that of the heating part.

The heating part and the lead part may include an electrically conductive common layer extending from the lead part to the heating part. The lead part may further include an electrically conductive additional layer provided in contact with the common layer.

The additional layer may have a sheet resistance lower than that of the common layer. The additional conductive layer may contain at least one of Cu, Au, Ni, Co, Ta, W, Mo, Rh, and alloys thereof.

The lead part and the heating part may be made of the same material. The lead part may have a thickness greater than that of the heating part.

At least one of the lead and heating parts may be formed by sputtering.

The heater may thermally expand when energized to cause the electromagnetic transducer or magnetoresistive device to project.

The heating part may be formed in a strip having opposite ends. The heater may further comprise a lead part which is connected in series to the heating part and has a sheet resistance lower than that of the heating part. The lead parts may be respectively connected to the opposite ends of the heating part.

The heating part may be shaped in a strip winding in a rectangular wave pattern.

In another aspect, the present invention relates to a head gimbal assembly comprising a support, a thin-film magnetic head formed on the support, and a gimbal for securing the support. The thin-film magnetic head has at least either an electromagnetic transducer or a magnetoresistive device, and a sheet-shaped heater for generating heat when energized. The heater includes a heating part with a predetermined sheet resistance and a lead part which is connected in series to the heating part and has a sheet resistance lower than that of the heating part.

In further aspect, the present invention relates to a hard disk drive comprising a support, a thin-film magnetic head formed on the support, and a recording medium opposing the thin-film magnetic head. The thin-film magnetic head has at least either an electromagnetic transducer or a magnetoresistive device, and a sheet-shaped heater for generating heat when energized. The heater includes a heating part with a predetermined sheet resistance and a lead part which is connected in series to the heating part and has a sheet resistance lower than that of the heating part.

The heater may thermally expand when energized to cause the electromagnetic transducer or magnetoresistive device to project so that a distance between the recording medium and the electromagnetic transducer or magnetoresistive device is reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 15 is a chart showing data of Comparative Example 1 and Examples 1 to 18.

FIG. 16 is a chart showing data of Comparative Example 2 and Examples 19 to 23.

DESCRIPTION OF THE PREFERRED EMBODIMENTS

Figure 1:
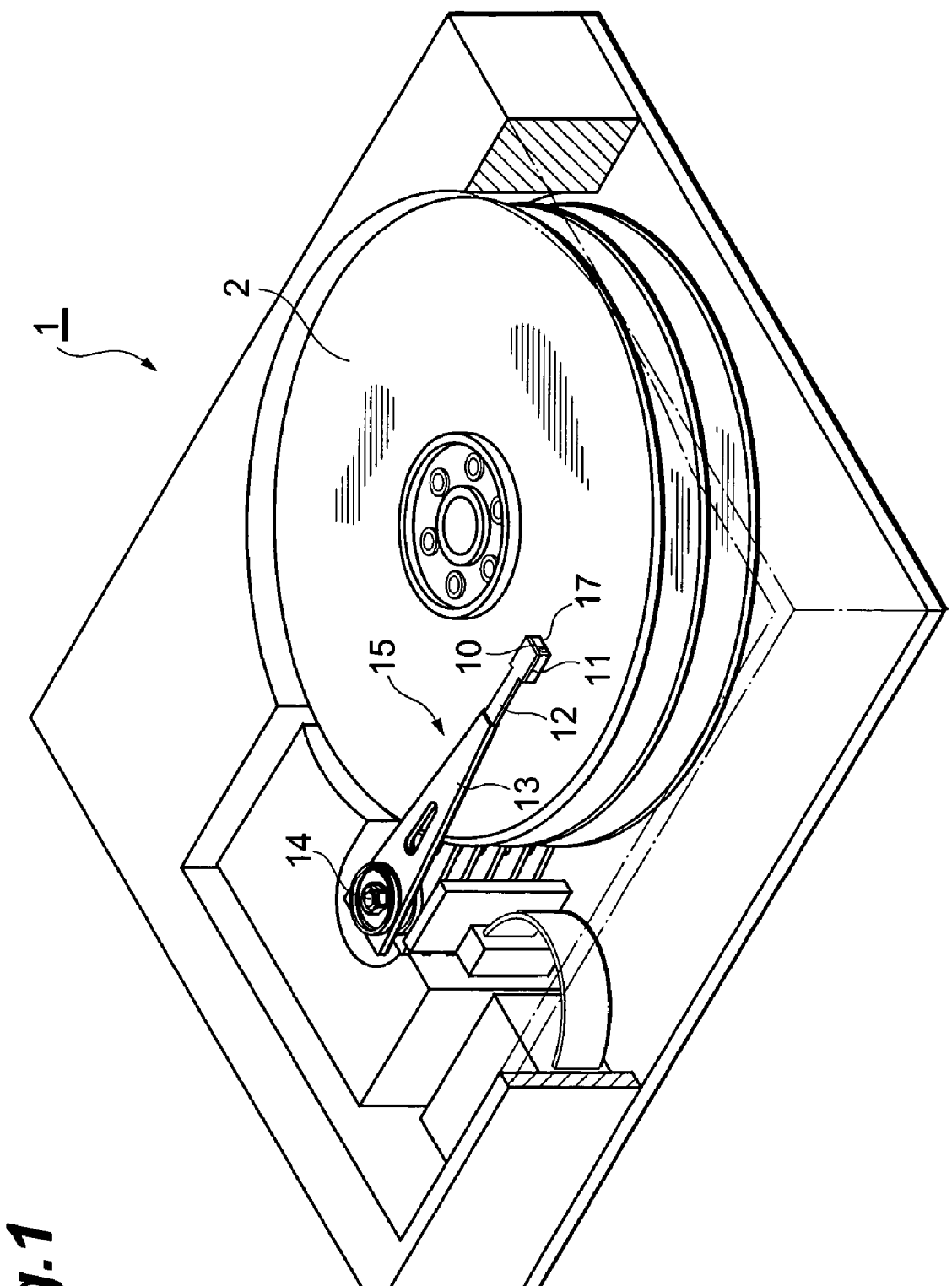
FIG. 1 is a perspective view showing an embodiment of the hard disk drive in accordance with the present invention.

The preferred embodiments of the present invention will be described below in greater detail with reference to the accompanying drawings. To facilitate understanding, identical reference numerals are used, where possible, to designate identical or equivalent elements that are common to the drawings, and these elements will not be explained repeatedly.

FIG. 1 is a view showing a hard disk drive with a thin-film magnetic head in accordance with this embodiment. The hard disk drive 1 is adapted to actuate a head gimbal assembly (HGA) 15 so that a thin-film magnetic head 10 records/reproduces magnetic information onto/from a recording surface (the upper face in FIG. 1) of a hard disk (i.e., recording medium) 2 rotating at high speed. The head gimbal assembly 15 has a gimbal 12 holding a head slider 11 on which the thin-film magnetic head 10 is provided, and a suspension arm 13 connected to the gimbal 12. The head gimbal assembly 15 is rotatable about a shaft 14, by a voice coil motor, for example. As the head gimbal assembly 15 rotates, the head slider 11 moves radially, that is, in the directions traversing track lines of the hard disk 2.

Figure 2:
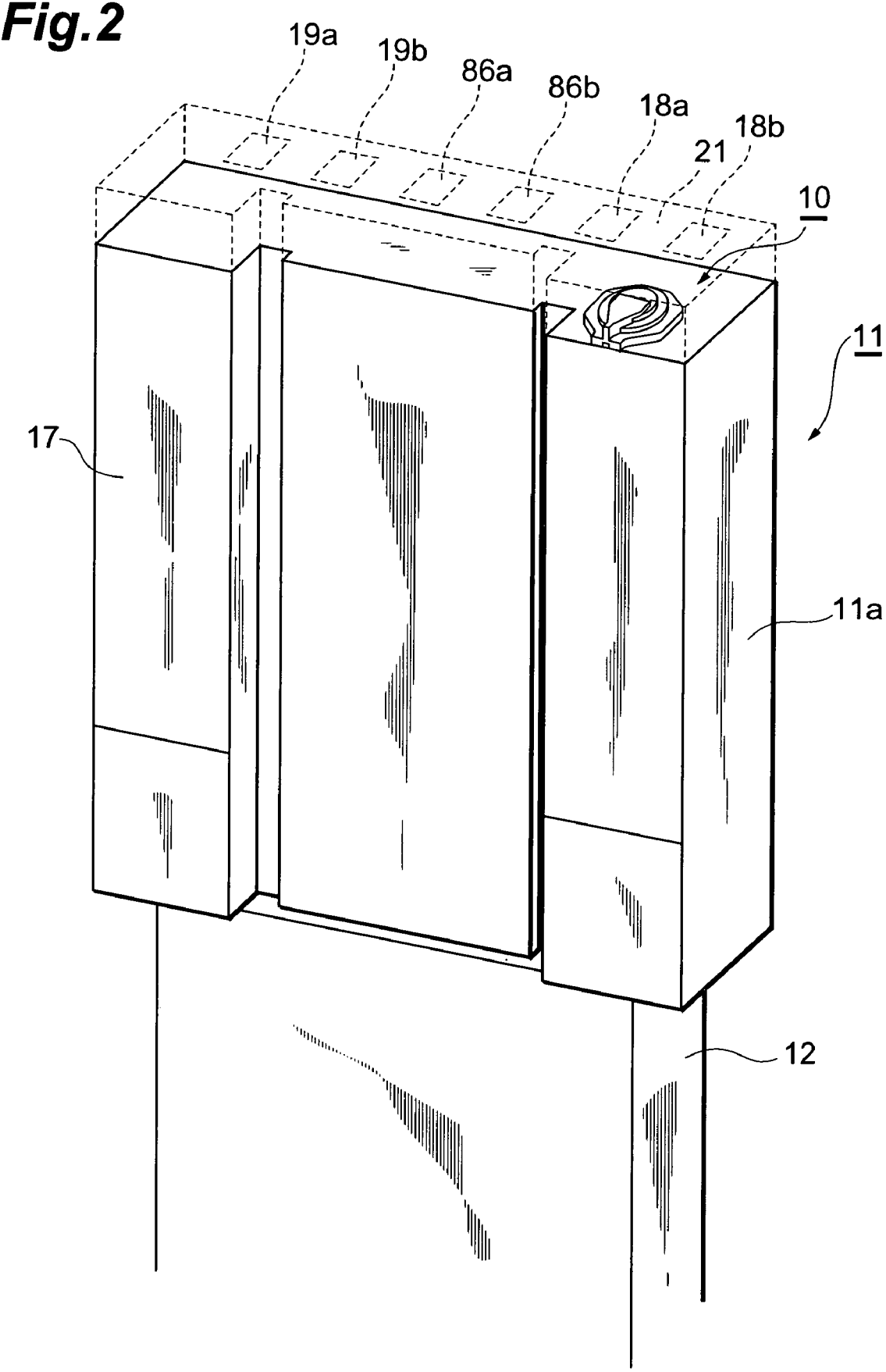
FIG. 2 is a perspective view showing a head slider.

FIG. 2 is an enlarged perspective view showing the head slider 11. The head slider 11 has a support 11a with substantially rectangular parallelepiped shape mainly composed of AlTiC ($Al_2O_3$-TiC), and the thin-film magnetic head 10 is provided on the support 11a. The front-side face of the head slider 11 in the drawing is a facing surface to oppose a recording surface of the hard disk 2, and is referred to as an air bearing surface (ABS) 17. When the hard disk 2 rotates, the airflows caused by the rotation levitates the head slider 11, whereby the air bearing surface 17 moves away from the recording surface of the hard disk 2. The thin-film magnetic head 10 is provided with an overcoat layer 21 indicated by the broken lines in the drawing (which will be explained later in detail) to protect the head 10. Attached onto the overcoat layer 21 are recording pads 18a and 18b, reproducing pads 19a and 19b, and heater pads 86a and 86b, which will be explained later. Attached to the suspension arm 13 shown in FIG. 1 are leads (not depicted), connected to the respective pads, for input/output of electric signals. The air bearing surface 17 may be coated with DLC (Diamond-Like Carbon) or the like.

Figure 3:
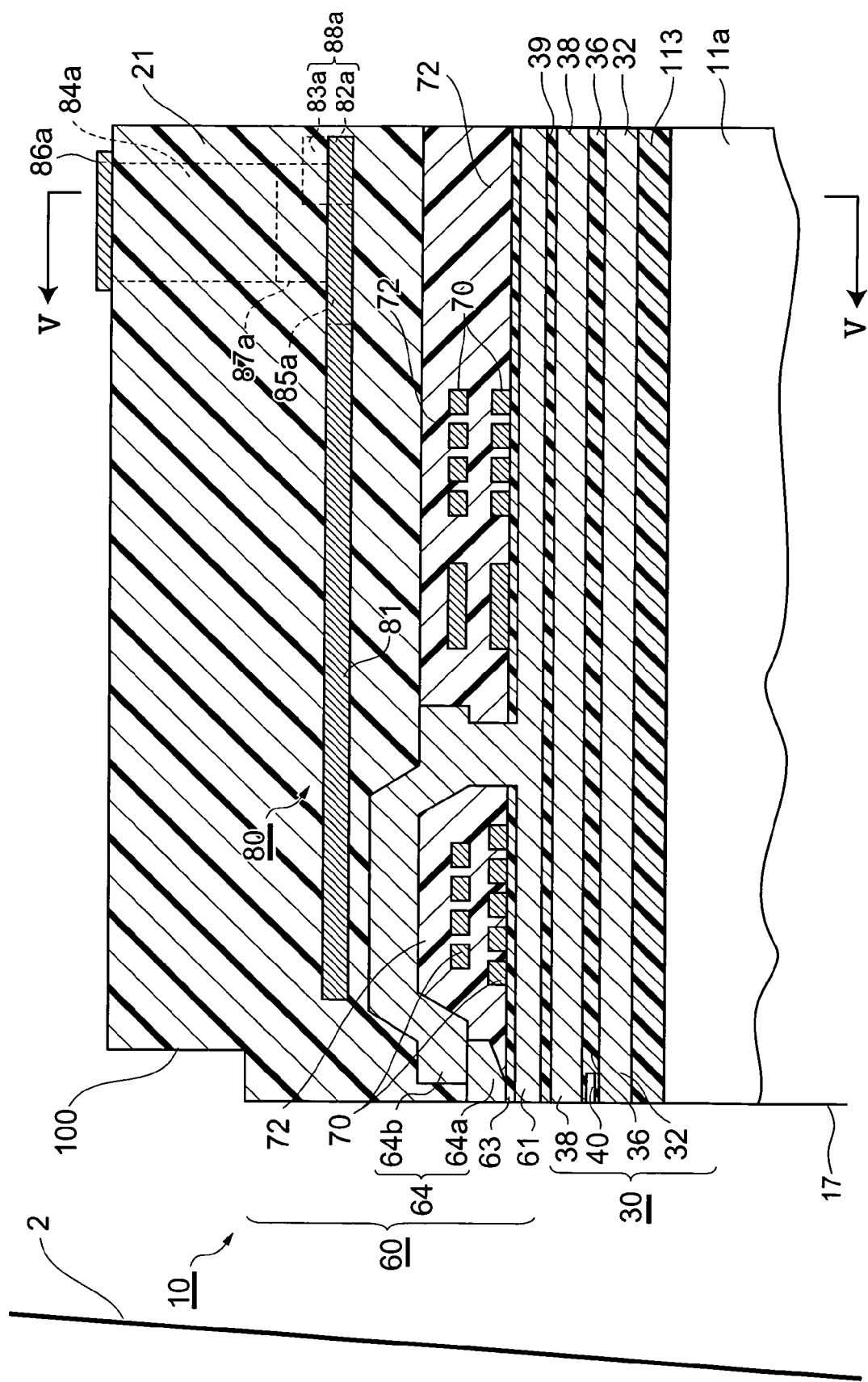
FIG. 3 is a sectional view showing the thin-film magnetic head in accordance with the embodiment.
Figure 4:
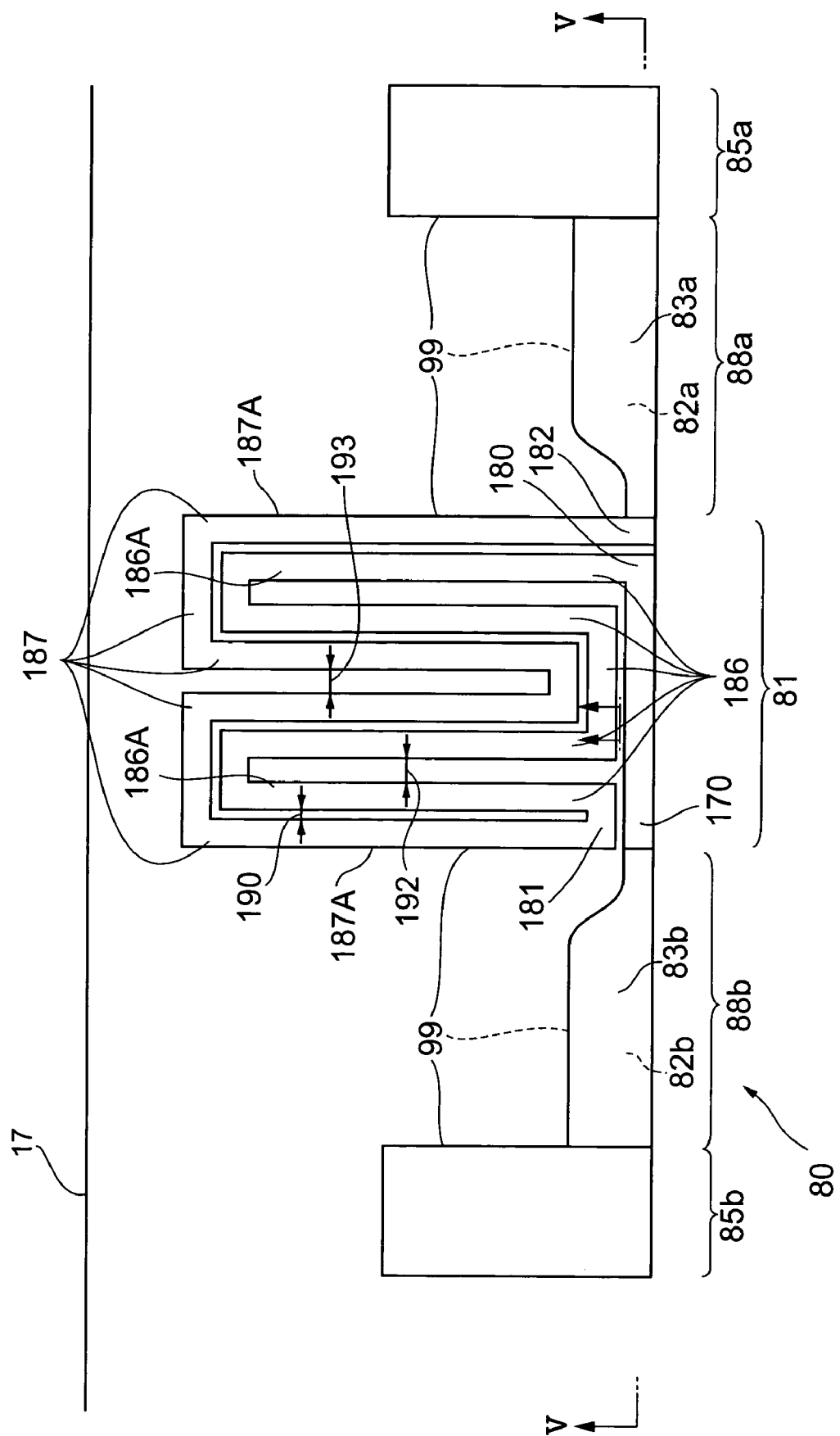
FIG. 4 is a plan view showing a heater of the thin-film magnetic head in accordance with the embodiment.
Figure 5:
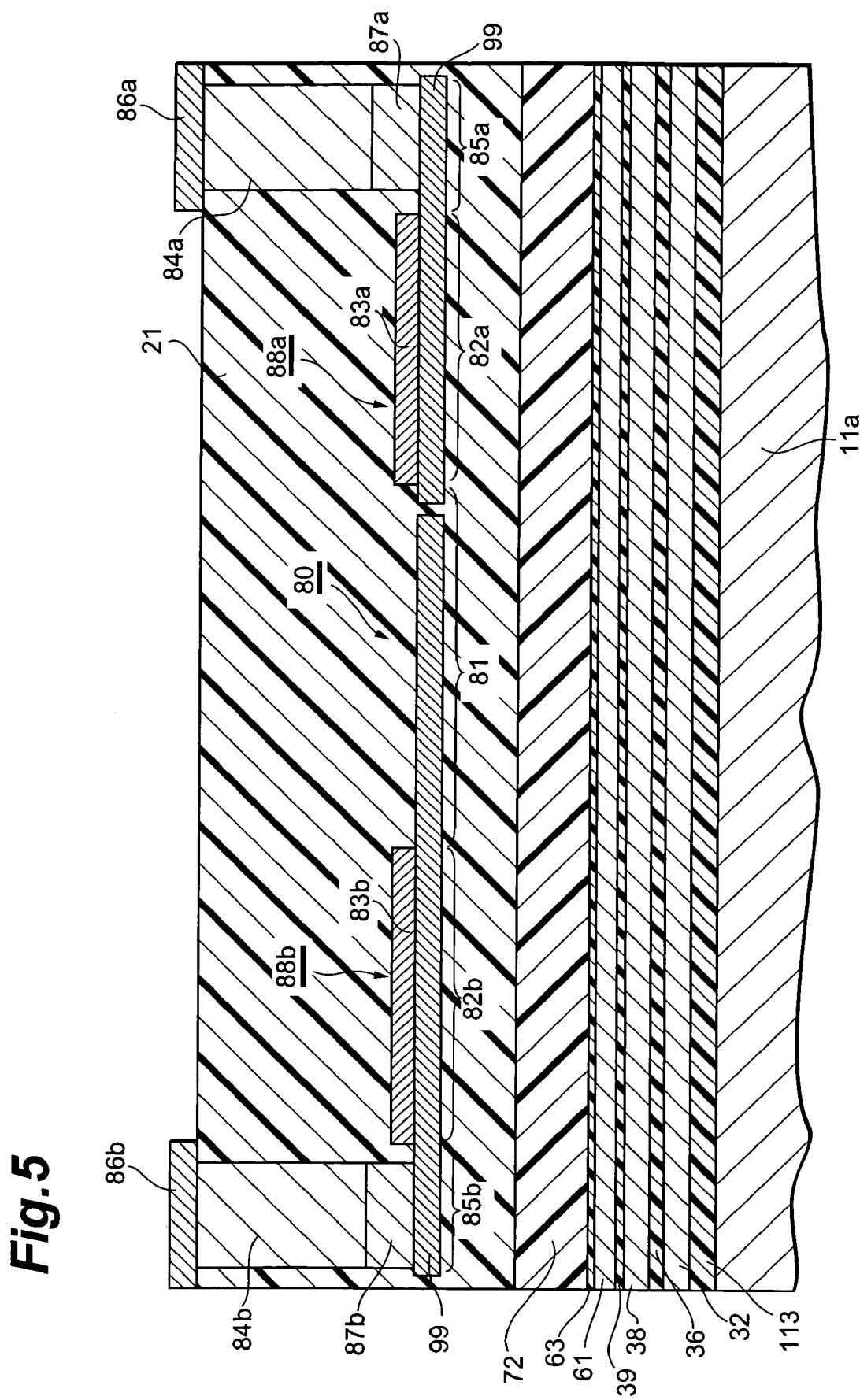
FIG. 5 is a sectional view of the thin-film magnetic head taken along the line V—V of FIG. 3.

FIG. 3 is a sectional view of the thin-film magnetic head 10 taken perpendicularly to the air bearing surface 17 and also perpendicularly to the track line. FIG. 4 is a plan view showing a heater layer in the thin-film magnetic head 10. The air bearing surface 17 is placed on the upper side of FIG. 4. FIG. 5 is a sectional view of the thin-film magnetic head 10 taken parallel to the air bearing surface 17 along the V—V line in FIGS. 3 and 4. The thin-film magnetic head 10 is formed on the support 11a, and is a combination head mainly composed of a reproducing head part 30, a recording head part 60 and the overcoat layer 21 which are successively provided on the support 11a in the order written, as shown in FIG. 3. The reproducing head part 30 includes a GMR (Giant MagnetoResistive) device 40. The recording head part 60 is an inductive electromagnetic transducer. The overcoat layer 21 covers the recording head part 60.

The support 11a is a wafer-like substrate made of AlTiC ($Al_2O_3$-TiC) or the like. On the support 11a, an undercoat layer 113 made of electrically insulating material such as alumina is formed with a thickness of about 1 μm to about 10 μm.

The reproducing head part 30 is disposed on the undercoat layer 113 and has a lower shield layer 32, an electrically insulating layer 36 holding the GMR device 40 from its upper and lower sides, and an upper shield layer 38, which are laminated on the undercoat layer 113 in the order written. The GMR device 40 is a device utilizing a giant magnetoresistive effect with a high magnetoresistance change ratio. The GMR device 40 has a multilayer structure (not depicted) and is exposed on the ABS 17. Each of the lower shield layer 32 and upper shield layer 38 contains magnetic material and acts to prevent the GMR device 40 from sensing unnecessary external magnetic fields. The lower shield layer 32 has a thickness of about 1 μm to about 3 μm, and the upper shield layer 38 has a thickness of about 1 μm to about 4 μm. The insulating layer 36 has a thickness of about 0.05 μm to about 1.0 μm. Words "lower" and "upper" used in the specification, as in the case of shield layers, refer to respective sides closer to and farther from the support 11a.

The recording head part 60 is a longitudinal recording type of inductive electromagnetic transducer, which is formed on the reproducing head part 30 with an electrically insulating layer 39 therebetween. Alumina or the like with a thickness of about 0.1 μm to about 2.0 μm can be used as the insulating layer 39, though the layer 39 is not always necessary. The recording head part 60 has a lower magnetic pole 61 made of soft magnetic material and a gap layer 63 made of nonmagnetic electrically insulating material, which are provided successively on the insulating layer 39 in the order written. Laminated on the gap layer 63 are a magnetic pole part layer 64a on the ABS 17 side and an electrically insulating layer 72 on the side away from the ABS 17. Two stages, i.e., upper and lower stages, of thin-film coils 70 are embedded in the insulating layer 72. A yoke part layer 64b is provided on the magnetic pole part layer 64a and the insulating layer 72. The magnetic pole part layer 64a and the yoke part layer 64b constitute an upper magnetic pole 64. Some of the thin-film coils 70 are sandwiched between the yoke part layer 64b and the lower magnetic pole 61. The yoke part layer 64b magnetically connects with the lower magnetic pole 61 on the side away from the ABS 17. The lower magnetic pole 61, gap layer 63, thin-film coils 70, insulating layer 72, and upper magnetic pole 64 constitute the recording head part 60.

The lower magnetic pole 61 is made of magnetic material such as permalloy (NiFe), and has a thickness of about 1 μm to about 3 μm, for example.

The gap layer 63 is a nonmagnetic electrical insulator such as alumina ($Al_2O_3$) or a combination of a nonmagnetic electrical conductor and a nonmagnetic electrical insulator, and has a thickness of about 0.05 μm to about 0.5 μm, for example.

The magnetic pole part layer 64a may be made of permalloy (NiFe) or other material such as (1) one containing iron and nitrogen atoms, (2) one containing iron, zirconia and oxygen atoms, or (3) one containing iron and nickel elements. The thickness of the magnetic pole part layer 64a is about 0.5 μm to about 3.5 μm, for example, and preferably 1.0 μm to 2.0 μm.

The yoke part layer 64b is made of the same material as that for the magnetic pole part layer 64a, and has a thickness of about 1 μm to about 5 μm, for example.

The thin-film coils 70 are made of electrically conductive material such as Cu, and each of the coils 70 has a thickness of about 1 μm to about 5 μm, for example.

The insulating layer 72 is made of electrically insulating material such as alumina or resist, and has a thickness of about 0.1 μm to about 5 μm, for example.

When a recording current is fed through the thin-film coils 70, a magnetic flux occurs between the magnetic pole part layer 64a and the lower magnetic pole 61, whereby information can be recorded on a recording medium such as hard disk.

The overcoat layer 21 is for protecting the recording head part 60 of the thin-film magnetic head 10, and is made of electrically insulating material such as alumina. The overcoat layer 21 is disposed on the recording head part 60 and has a thickness of about 5.0 μm to about 30 μm. In the overcoat layer 21, a cutout 100 is formed at an edge defined by the ABS 17 and the upper face of the layer 21 farthest from the support 11a.

In particular, as shown in FIGS. 3 to 5, a sheet-shaped heater 80 made of electrically conductive material is disposed in the overcoat layer 21 in this embodiment. The heater 80 is formed in parallel with the upper shield layer 38 and the like in the overcoat layer 21 while being separated from the ABS 17 by a predetermined distance.

As shown in FIGS. 4 and 5, the heater 80 includes a sheet-shaped electrically conductive common layer 99 having a sheet resistance $SR1=(\rho1/d1)$, where $\rho1$ is the resistivity, and $d1$ is the thickness. The common layer 99 includes a heating part 81 formed in a single strip winding in the layer, base parts 82a and 82b connected to the opposite ends of the heating part 81, respectively, and rectangular extraction electrodes 85a and 85b connected to the ends of the base parts 82a and 82b, respectively. The base parts 82a and 82b are lower layers of lead parts 88a and 88b, as will be explained later. The lead parts 88a and 88b are connected to the heating part 81 in series.

As shown in FIG. 4, the heating part 81 has a initial part 186 travelling from a start point 180 to a turning point 181 while winding in pattern like a rectangular wave, a latter part 187 doubling back from the turning point 181 to an end point 182 near the start point 180 while following a path substantially parallel to the initial part 186, and a connection part 170 for connecting the start point 180 to the base part 82b of the lead part 88b. The end part 182 is connected to the base part 82a of the lead part 88a. The gap 190 between the initial part 186 and the latter part 187 extending adjacent to each other is narrower than the gap 192 between the rising and falling portions of the wave cycle of the initial part 186 or the gap 193 between the rising and falling portions of the wave cycle of the latter part 187.

Electrically conductive additional layers 83a and 83b are laminated on the base parts 82a and 82b, respectively, in conformity to their forms. Each of the additional layers 83a and 83b is made of a sheet-shaped material having a sheet resistance $SR2=(\rho2/d2)$, where $\rho2$ is the resistivity, and $d2$ is the thickness. The base part 82a and additional conductive layer 83a constitute the lead part 88a acting as a parallel circuit for electrically connecting the extraction electrode 85a to one end of the heating part 81, whereas the base part 82b and additional conductive layer 83b constitute the lead part 88b acting as a parallel circuit for electrically connecting the extraction electrode 85b to the other end of the heating part 81. The extraction electrode 85a, lead part 88a, heating part 81, lead part 88b, and extraction electrode 85b constitute the heater 80 forming a sheet-shaped conductive path with a predetermined length.

The thickness $d1$ of the common layer 99 forming the heating part 81, extraction electrodes 85a, 85b, and base parts 82a, 82b of the lead parts 88a, 88b is about 100 to 300 nm, for example, whereas the resistivity $\rho1$ of the common layer 99 is about 15 to 25 μΩ·cm, for example. Preferably, the material for the common layer 99 contains at least one of Cu, Au, Ni, Co, Ta, W, Mo, Rh, and alloys thereof.

The thickness $d2$ of the additional layers 83a, 83b of the lead parts 88a, 88b is about 50 to 200 nm, for example, whereas the resistivity $\rho2$ of the additional layers 83a, 83b is about 15 to 25 μΩ·cm, for example. Preferably, the material for the additional layers 83a, 83b contains at least one of Cu, Au, Ni, Co, Ta, W, Mo, Rh, and alloys thereof.

Here, the lead parts 88a, 88b, which are parallel circuits formed by the base parts 82a, 82b and additional conductive layers 83a, 83b, exhibit a sheet resistance SR3 represented by the following expression (1):

$$SR3 = \frac{\rho_1}{d_1}\left(\frac{\frac{\rho_2}{d_2}}{\frac{\rho_2}{d_2}+\frac{\rho_1}{d_1}}\right) = SR1\left(\frac{1}{SR1/SR2+1}\right) \qquad (1)$$

Namely, it can be seen that the sheet resistance SR3 of the lead parts 88a, 88b is lower than the sheet resistance SR1 of the heating part 81 as long as SR2 is not infinite, that is, as long as the additional conductive layers 83a, 83b are electric conductors.

The air bearing surface (ABS) 17 extends in the horizontal direction in FIG. 4 and a direction perpendicular to the plane of FIG. 4, and is positioned higher than the heater 80 in FIG. 4. In the heating part 81 of the heater 80, the total length of the portion extending in a direction substantially perpendicular to the ABS 17 is greater than the total length of the portion extending in a direction substantially parallel to the ABS 17.

As shown in FIGS. 3 and 5, electrically conductive electrode film members 87a and 87b are formed on the extraction electrodes 85a and 85b, respectively. Disposed on the electrode film members 87a and 87b are upwardly extending bumps 84a and 84b formed by electrolytic plating in which the electrode film members 87a and 87b are used as the electrodes. The electrode film members 87a, 87b and bumps 84a, 84b are made of electrically conductive material such as Cu. The thickness of the electrode film members 87a, 87b is about 50 to 400 nm, whereas the thickness of the bumps 84a, 84b is about 5 to 20 μm.

Upper ends of the bumps 84a, 84b are exposed from the overcoat layer 21, whereas heater pads 86a, 86b are attached to the exposed surfaces, respectively. By way of the heater pads 86a, 86b, a current is supplied to the heater 80. Similarly, the recording head part 60 is connected to the recording pads 18a, 18b (see FIG. 2) whereas the magnetoresistive device 40 of the reproducing head part 30 is connected to the reproducing heads 19a, 19b, though not depicted in FIGS. 3 and 5 for the sake of simplification.

Figure 6:
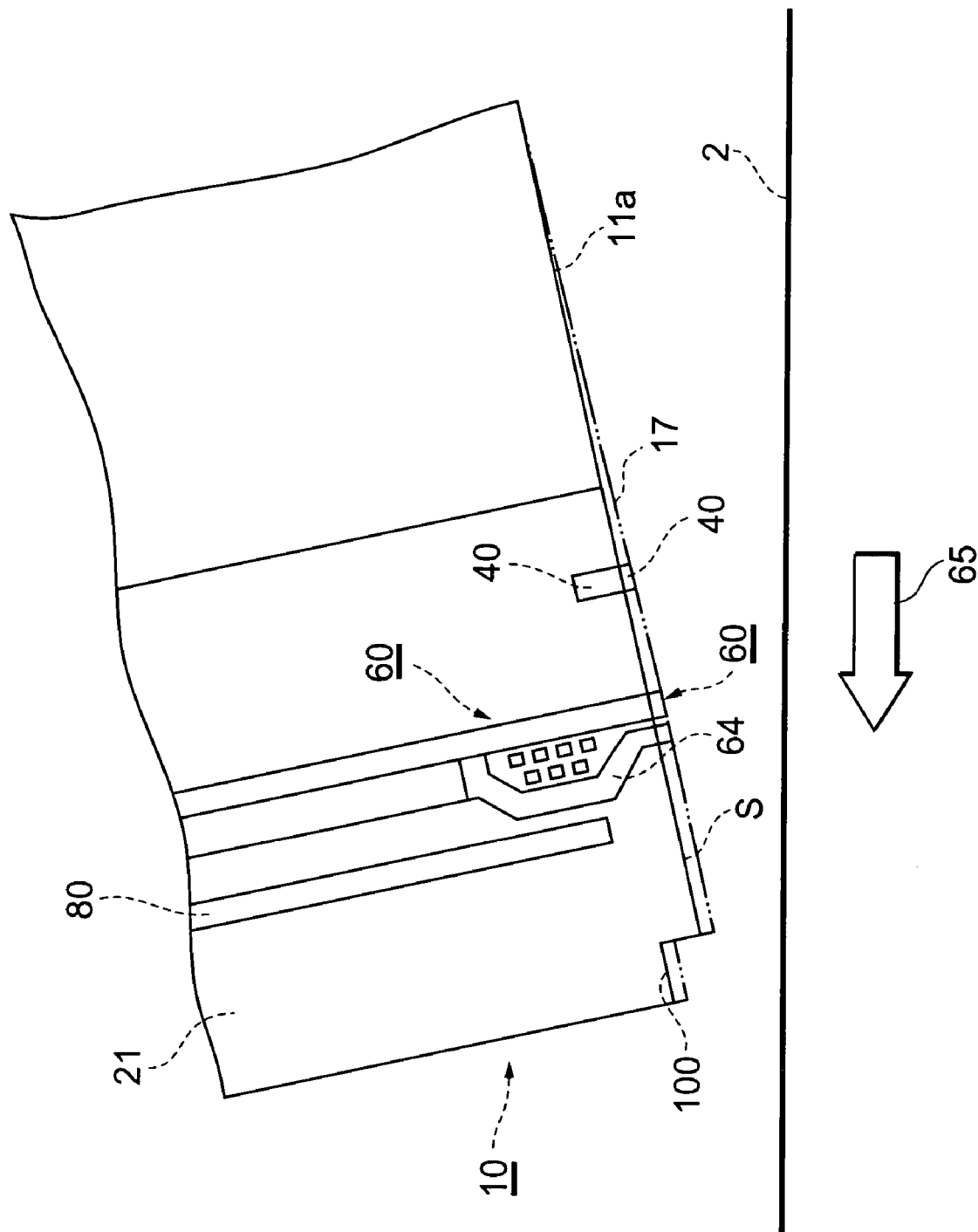
FIG. 6 is a schematic view showing a state where the thin-film magnetic head in accordance with the embodiment thermally expands.

Operations of the thin-film magnetic head 10, head gimbal assembly 15, and hard disk drive 1 will now be described. As shown in FIG. 6, when the hard disk 2 rotates in the direction of the arrow 65, the thin-film magnetic head 10 levitates because of the airflow, whereby the recording head part 60 tilts forward (attains a forward tilting posture)

so that its upper magnetic pole 64 side approaches the hard disk 2. When the heater 80 is energized in this situation, the portion of the thin-film magnetic head 10 surrounding the heater 80 is thermally expanded by the heat generated from the heater 80, whereby the ABS 17 of the thin-film magnetic head 10 and support 11a projects toward the recording medium 2 as indicated by dash-double-dot lines in FIG. 6. This reduces the gap between the hard disk 2 and the GMR device 40 and the recording head part 60, thereby yielding a higher reproducing output and a higher recording density. Regulating the amount of current fed through the heater 80 can adjust the amount of the projection, thereby making it possible to control the distance between the recording medium 2 and the recording head part 60 or the GMR device 40.

As can be seen from expression (1), the sheet resistance RS3 of each of the lead parts 88a and 88b is lower than the sheet resistance RS1 of the heating part 81. Therefore, when the heater 80 is energized, heat is intensively generated at the heat generating part 81. This makes it possible to intensively expand the heating part 81 and its surroundings, so as to regulate the amount of projection and save energy.

Here, the sheet resistance $SR2=(\rho2/d2)$ of the additional conductive layers 83a, 83b is preferably lower than the sheet resistance $SR1=(\rho1/d1)$ of the common layer 99 forming the base layers 82a, 82b. In this case, as can be seen from expression (1), the sheet resistance SR3 of the lead parts 88a, 88b can be made even lower than the sheet resistance SR1 of the heating part 81, so that the heat an be more concentrated at the heating part 81.

Since the heater 80 is provided in the overcoat layer 21 while the recording head part 60 is disposed between the overcoat layer 21 and the GMR device 40, the gap between the GMR device 40 and the heating layer 80 is wider than the gap between the recording head part 60 and the heater 80. Therefore, the GMR device 40, which is relatively susceptible to heat, can become less likely to be adversely affected by a high temperature, thereby improving the reliability of the thin-film magnetic head 10.

Since the overcoat layer 21 in the thin-film magnetic head 10 is provided with the cutout 100, the ABS 17 of the thin-film magnetic head 10 is less likely to come into contact with the recording medium 2 even when projected toward the hard disk 2 upon the thermal expansion. For the shape of the cutout 100, it is not limited to a single-stage cutout with a reverse L-shape as in this embodiment, and may be a multistage cutout, a sloped cutout, and the like.

In the heater 80, the initial part 186 and the latter part 187 wind along each other as shown in FIG. 4, so that magnetic fields generated from these parts 186 and 187 between the start and end points 180 and 182 and the turning point 181 cancel out each other as can be seen from Ampere's corkscrew rule. Therefore, the magnetic field leakage decreases and becomes less likely to adversely affect the recording head part 60 and the magnetoresistive device 40. Since the gap 190 is narrower than the gap 192 or 193, a portion of the initial part 186 and a portion of the latter part 187 which are disposed close to each other are less likely to be influenced by the magnetic fields generated from other distanced portions of the parts 186 and 187. This enables the magnetic fields caused by energizing the heating layer 80 to be cancelled out each other more favorably. Hence, the magnetic field leakage from portions 186A of the initial part 186 and portions 187A of the latter part 187 disposed so as to extend along each other on the outermost sides of the heating layer 80 is reduced in particular.

The heater 80 extends farther in the direction substantially perpendicular to the ABS 17 than it does in the direction substantially parallel to the ABS 17. Therefore, the heater 80 itself easily expands perpendicularly to the ABS 17 when energized. Accordingly, the GMR device 40 and the recording head part 60 can efficiently project toward the recording medium 2.

As explained in the foregoing, this embodiment provides the thin-film magnetic head 10, head gimbal assembly 15, and hard disk drive 1 which can reduce the distance from the hard disk 2 and attain recording with a higher density.

Figure 7:
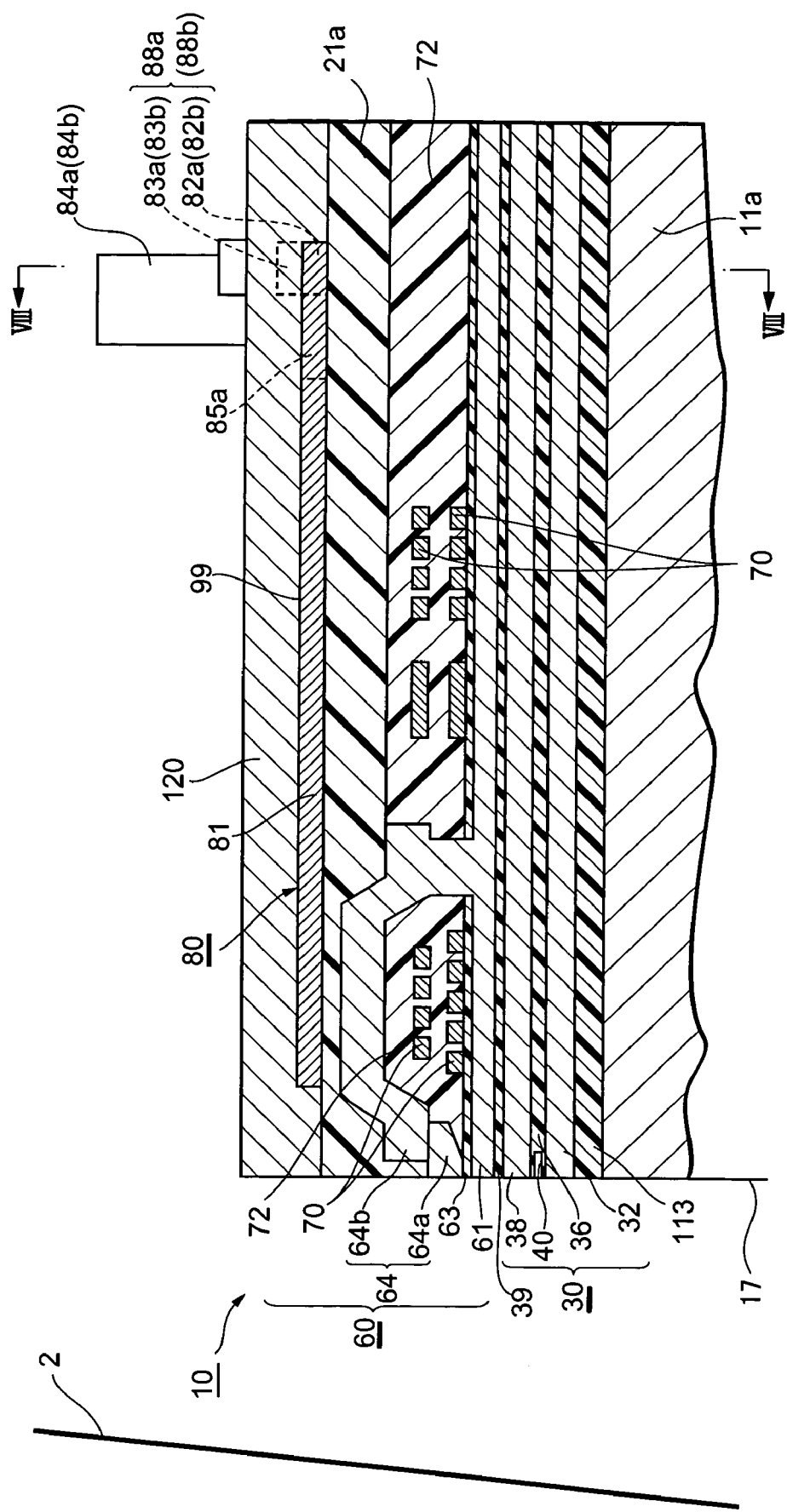
FIG. 7 is a sectional view showing a method of making the thin-film magnetic head in accordance with the embodiment.
Figure 8:
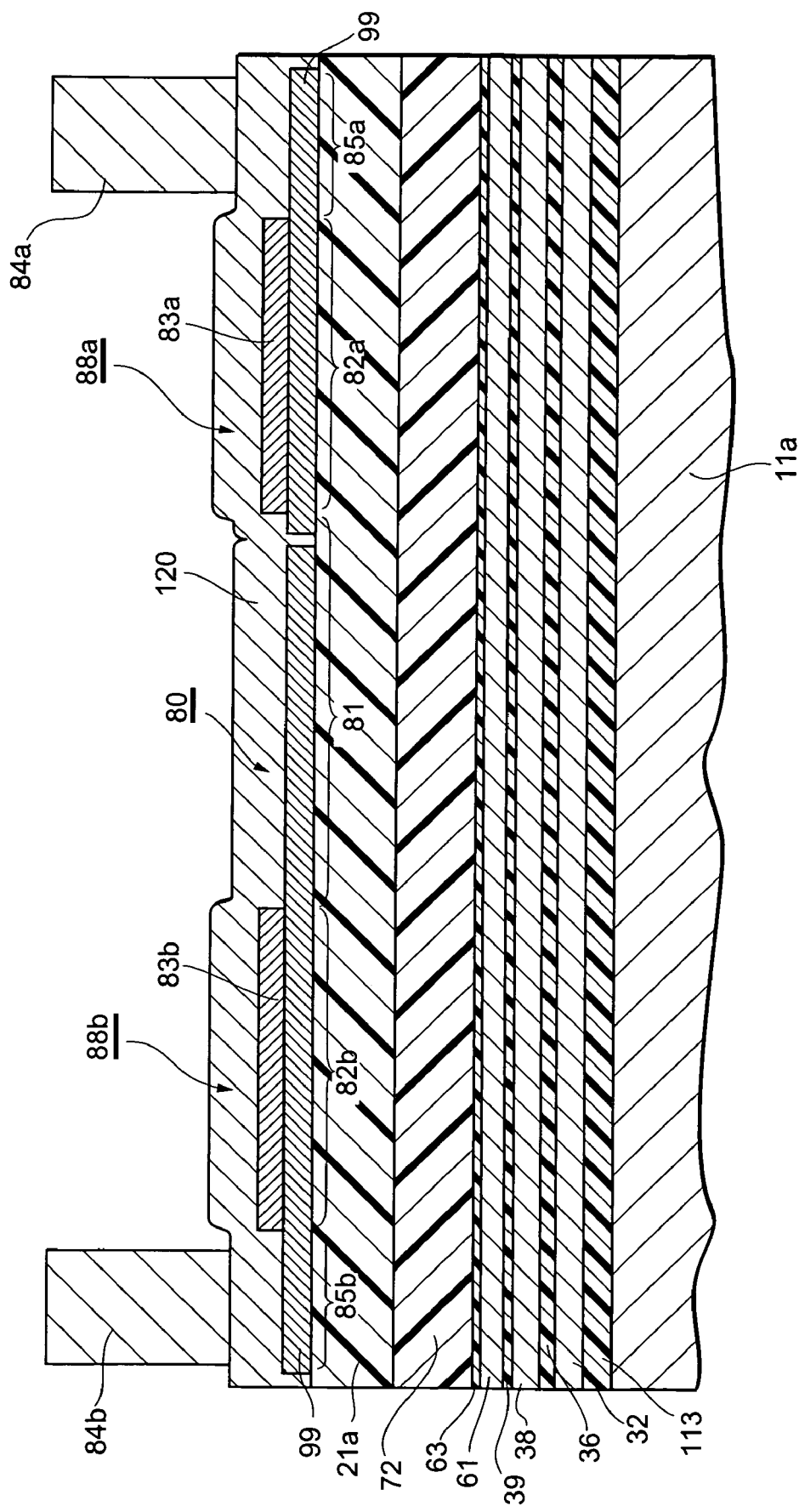
FIG. 8 is a sectional view taken along the line VIII—VIII of FIG. 7.
Figure 9:
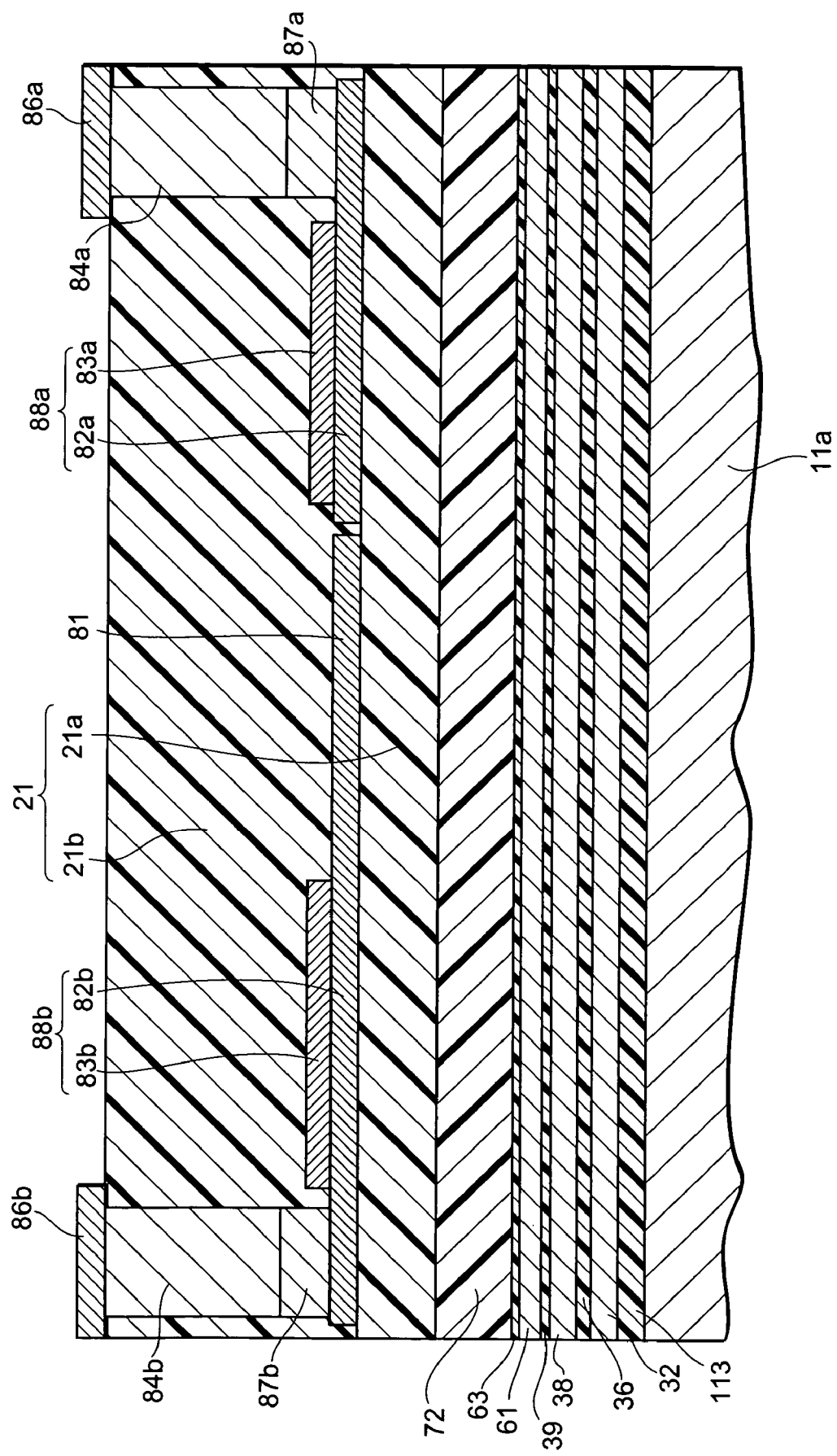
FIG. 9 is a sectional view showing a step subsequent to that of FIG. 8 in the method of making the thin-film magnetic head in accordance with the embodiment.

With reference to FIGS. 7 to 9, an example of the method of making a thin-film magnetic head in accordance with this embodiment will now be explained. Here, FIG. 7 is a sectional view of the thin-film magnetic head taken along a line perpendicular to the air bearing surface S and track line. FIG. 8 is a sectional view of the thin-film magnetic head, taken along a plane parallel to the air bearing surface S of the thin-film magnetic head, corresponding to the line VIII—VIII. Explanations of known manufacturing steps will be simplified.

First, as shown in FIGS. 7 and 8, the undercoat layer 113 made of electrically insulating material such as alumina ($Al_2O_3$) is formed, for example, by sputtering, on the support 11a which is a substrate made of AlTiC ($Al_2O_3$-TiC) or the like.

Subsequently, on the undercoat layer 113, the lower shield layer 32 made of magnetic material such as permalloy is formed, for example, by plating. Further, on the lower shield layer 32, the GMR device 40 and the electrically insulating layer 36, made of $Al_2O_3$ or the like, holding the GMR device 40 in its inside are formed using known techniques. The GMR device 40 includes a plurality of films in practice, but is depicted as a single layer in FIG. 6 for simplicity of the drawing. The GMR device 40 is formed on the ABS side of the thin-film magnetic head 10. Subsequently, on the insulating layer 36, the upper shield layer 38 is formed, for example, by plating. The reproducing head part 30 is provided in this way.

Next, on the upper shield layer 38, the electrically insulating layer 39 made of electrically insulating material such as $Al_2O_3$ is formed, for example, by sputtering.

Subsequently, on the insulating layer 39, the lower magnetic pole 61 made of permalloy is formed, for example, by sputtering. Then, on the lower magnetic pole 61, the gap layer 63 made of a nonmagnetic electrical insulator or a combination of a nonmagnetic electrical conductor and a nonmagnetic electrical insulator is formed, for example, by sputtering. Further, on the gap layer 63, the electrically insulating layer 72 with the two stages of thin-film coils 70 in its inside, and the magnetic pole part layer 64a and the yoke part layer 64b of the upper magnetic pole 64 are formed by a known method using photolithography, dry etching, or the like. These components are formed so that some of the thin-film coils 70 are held between the lower magnetic pole 61 and the upper magnetic pole 64. Though the two stages of the thin-film coils 70 are formed in this embodiment, the number of the stages is not limited thereto, and helical coils or the like may be formed instead of the thin film coils. The recording head part 60 is provided in this way.

Next, a nonmagnetic overcoat lower layer 21a is formed so as to cover the recording head part 60. Subsequently, on the overcoat layer 21a, a layer of electrically conductive material with a resistivity $\rho1$ and a thickness d1 is formed by sputtering, and thus formed layer is partly removed by ion milling or the like, so as to form the common layer 99 including the winding heating part 81, the base parts 82*a*, 82*b* of the lead parts 88*a*, 88*b* respectively connected to the both ends of the heating part 81, and the extraction electrodes 85*a*, 85*b* connected to respective end parts of the base parts 82*a*, 82*b*.

Further, on the base parts 82*a*, 82*b* of the common layer 99, additional conductive layers 83*a*, 83*b* made of electrically conductive material with a resistivity ρ2 and a thickness d2 are formed by sputtering or the like, respectively. This forms a lead part 88*a* provided with the base part 82*a* and additional conductive layer 83*a*, and a lead part 88*b* provided with the base part 82*b* and additional conductive layer 83*b*. Thus a heater 80 having the extraction electrodes 85*a*, 85*b*, lead parts 88*a*, 88*b*, and heating part 81 is completed.

Next, an electrode film 120 for plating made of electrically conductive material such as Cu is formed, by sputtering or the like, so as to cover the heater 80 and the exposed surface of the overcoat lower layer 21*a*. The electrode film 120 has a predetermined thickness, e.g., 50 to 400 nm.

Subsequently, by plating using the electrode film 120 as an electrode, upwardly extending bumps 84*a*, 84*b* are formed on the respective portions of the electrode film 120 in contact with the extraction electrodes 85*a*, 85*b*.

Then, as shown in FIG. 9, the exposed portion of the electrode film 120 is removed by ion milling or the like while using the bumps 84*a*, 84*b* as a mask. Here, the parts of the electrode film 120 under the bumps 84*a*, 84*b* are left as electrode film members 87*a*, 87*b* without being removed.

Thereafter, an insulating material such as $Al_2O_3$ is laminated as an upper layer by sputtering or the like, and is shaved by polishing, for example, to a desirable height so that the bumps 84*a*, 84*b* are exposed at the upper face, so as to yield an overcoat upper layer 21*b*. Then, heater pads 86*a*, 86*b* are disposed at the respective exposed portions of the upper end parts of the bumps 84*a*, 84*b*. Here, the overcoat lower layer 21*a* and overcoat upper layer 21*b* correspond to the overcoat layer 21. Though not depicted, recording pads and reproducing pads are also formed at this time. Further, though not depicted, a ridge of the overcoat layer 21 is cut, so as to form a cutout 100.

The foregoing completes the thin-film magnetic head 10 in accordance with this embodiment shown in FIGS. 3 to 5.

The method of making a thin-film magnetic head in accordance with this embodiment favorably forms the thin-film magnetic head 10 with the heater 80. In such a thin-film magnetic head 10, the heater 80 generates heat as mentioned above when energized while in use, so that the thin-film magnetic head 10 thermally expands, thereby reducing the distance between the GMR device 40 or recording head part 60 of the thin-film magnetic head 10 and the recording medium 2.

Since the sheet resistance RS3 of the lead parts 88*a*, 88*b* is lower than the sheet resistance RS1 of the heating part 81 as mentioned above, heat is intensively generated in the heat generating part 81 when the heater 80 is energized. This makes it possible to intensively expand the heating part 81 and its surroundings, so as to favorably regulate the amount of projection and save energy.

The heater 80 is produced in the step forming the overcoat layer 21 which is relatively simple and carried out after the relatively complicated steps forming the reproducing head part 30 and recording head part 60. Consequently, the thin-film magnetic head 10 can be made at a lower cost than in the case where a heating element is provided at the position lower than or flush with the reproducing head part 30 or the recording head part 60 from the support 11*a*.

Since the common layer 99 and additional conductive layers 83*a*, 83*b* are formed by sputtering, the variation in the thicknesses of these layers of the different thin-film magnetic heads can be reduced, thereby reducing the variation in the electrical resistances of their heaters 80.

Thereafter, a slider rail is formed on the support 11*a* by ion milling or the like, whereby the head slider 11 shown in FIG. 2 is obtained. Then the head slider 11 is mounted to the gimbal 12, and the gimbal 12 is connected to the suspension arm 13, whereby the head gimbal assembly 15 shown in FIG. 1 is completed. Thereafter the head gimbal assembly 15 is assembled so that the head slider 11 is movable above the hard disk 2 so as to enable recording and reproducing magnetic signals to and from the hard disk 2. The hard disk drive 1 shown in FIG. 1 is completed in this way.

Modified examples of the thin-film magnetic head in accordance with this embodiment will now be explained.

Figure 10:
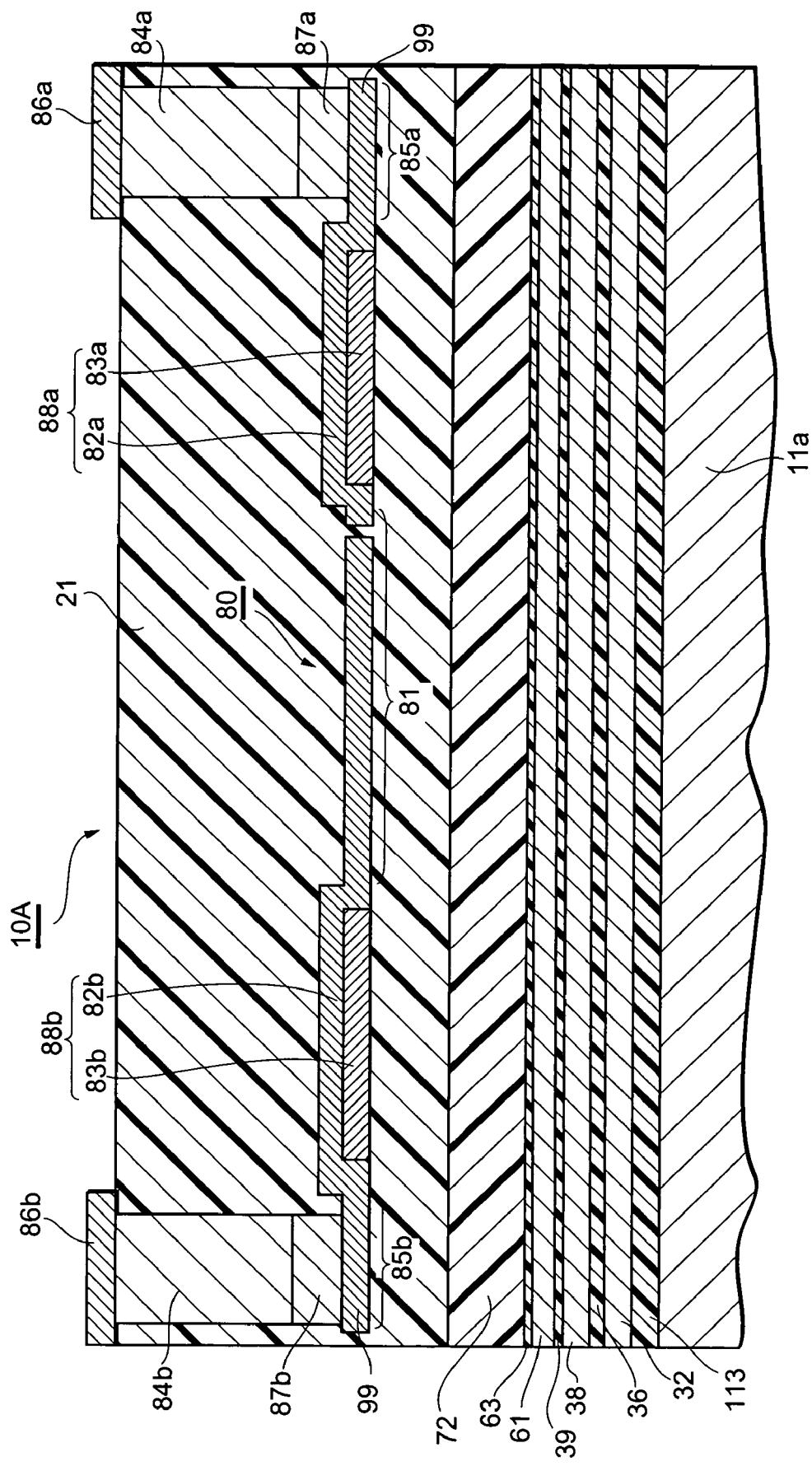
FIG. 10 is a sectional view showing a modified example of the thin-film magnetic head.

FIG. 10 shows a thin-film magnetic head 10A in accordance with a first modified example. This thin-film magnetic head 10A differs from the thin-film magnetic head 10 in that the additional conductive layers 83*a*, 83*b* are provided under the base parts 82*a*, 82*b* of the common layer 99 in the lead parts 88*a*, 88*b*, respectively. Such a thin-film magnetic head 10A can easily be obtained by forming the additional conductive layers 83*a*, 83*b* before forming the common layer 99 in the process of making the thin-film magnetic head 10.

Figure 11:
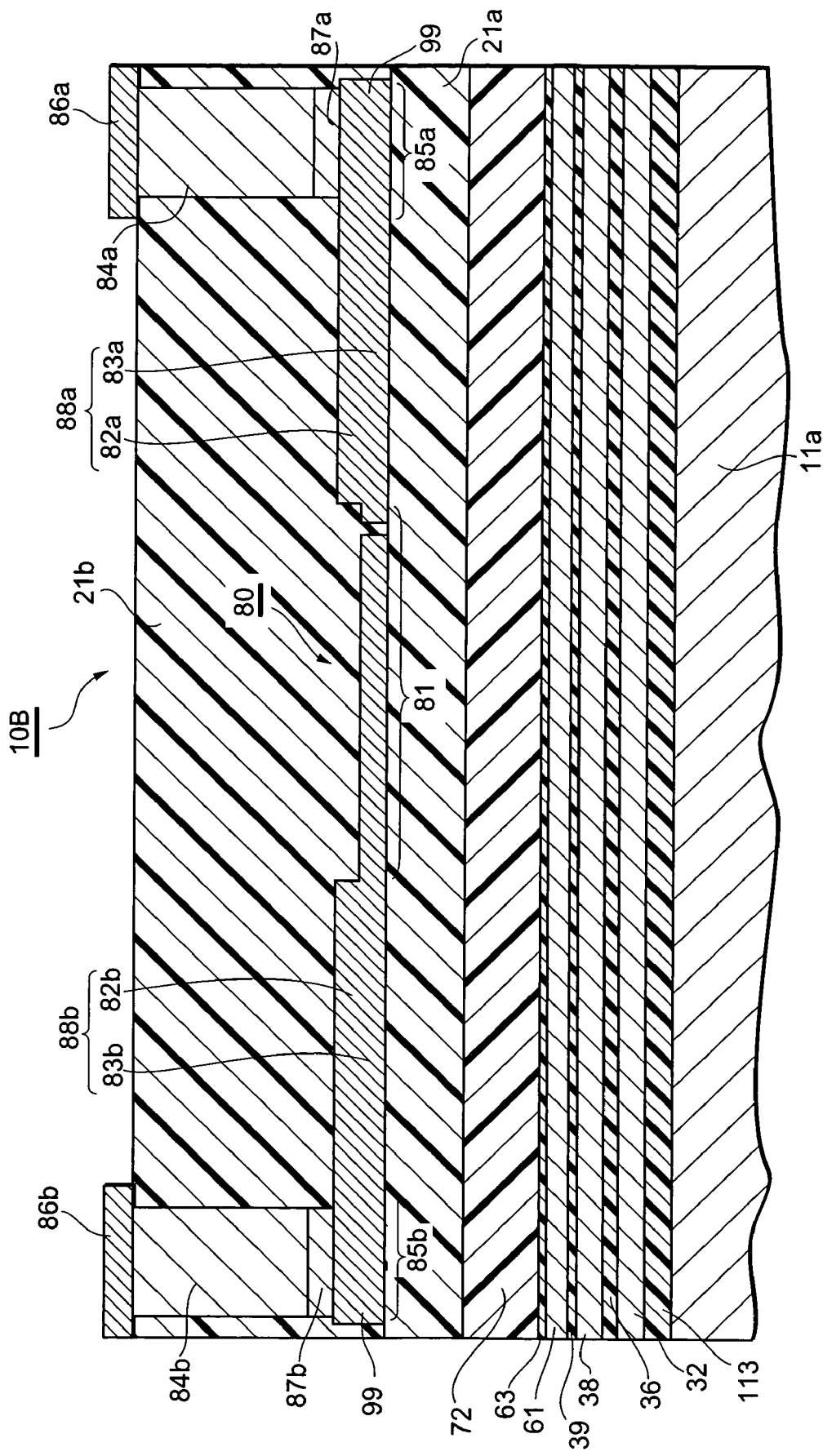
FIG. 11 is a sectional view showing a modified example of the thin-film magnetic head.

FIG. 11 shows a thin-film magnetic head 10B in accordance with a second modified example. This thin-film magnetic head 10B differs from the thin-film magnetic head 10 in that the additional conductive layers 83*a*, 83*b* of the lead parts 88*a*, 88*b* are made of the same material as with the base layers 82*a*, 82*b* of the lead parts 88*a*, 88*b*, i.e., the lead parts 88*a*, 88*b* are made of only the same material as with the heating part 81, and in that the thickness of the lead parts 88*a*, 88*b* is greater than that of the heating part 81. Such a thin-film magnetic head 10B can easily be obtained, for example, by forming the common layer 99 and then laminating the additional conductive layers 83*a*, 83*b* made of the same material as with the common layer 99 onto the base parts 82*a*, 82*b* in the process of making the thin-film magnetic head 10 (see FIG. 8).

Figure 12:
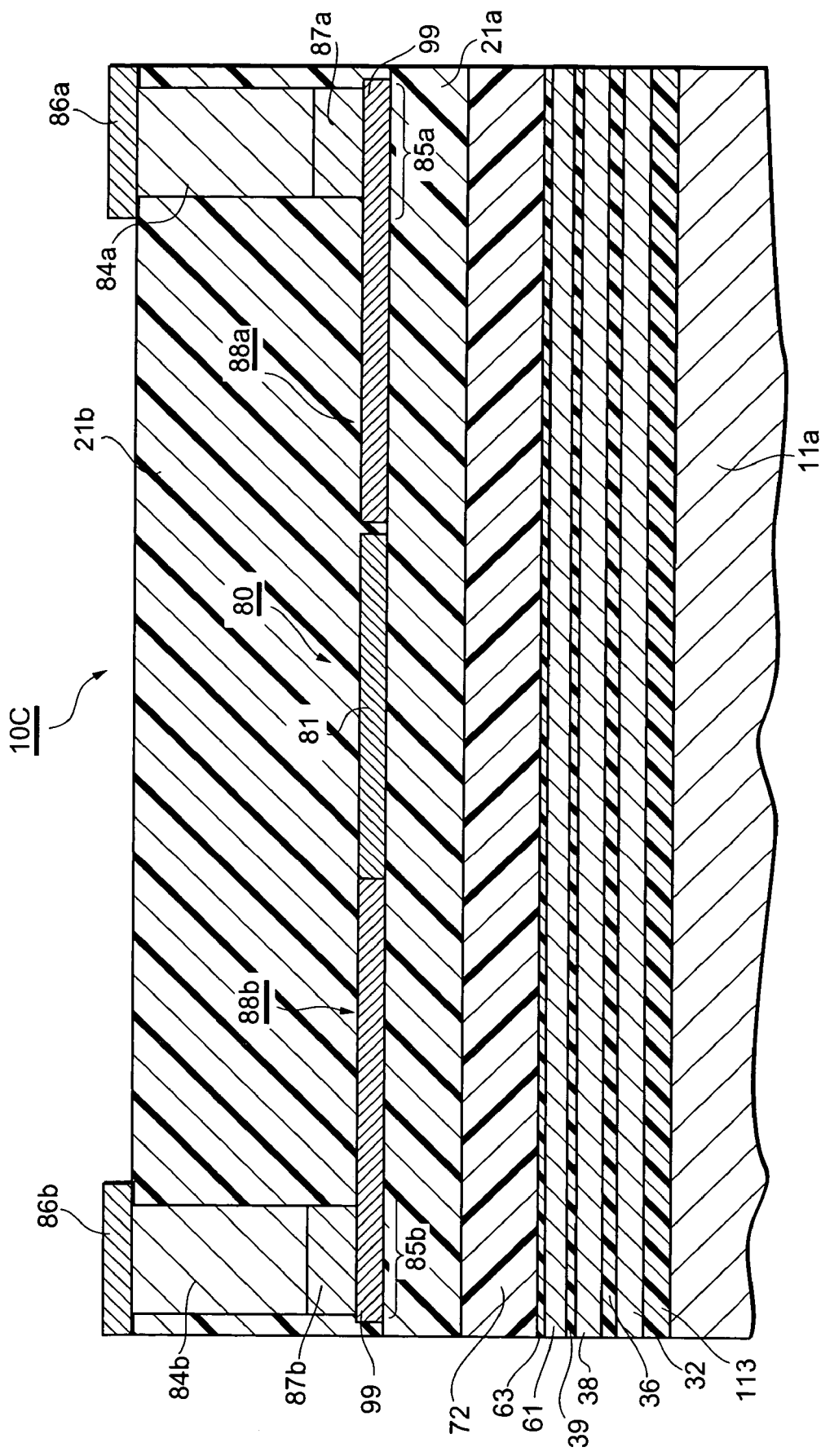
FIG. 12 is a sectional view showing a modified example of the thin-film magnetic head.

FIG. 12 shows a thin-film magnetic head 10C in accordance with a third modified example. The thin-film magnetic head 10C differs from the thin-film magnetic head 10 in that the thickness of the lead parts 88*a*, 88*b* is the same as that of the heating part 81, and that the lead parts 88*a*, 88*b* are formed from material different from that of the heating part 81 without having the base layer made of the same material as with the heating part 81. Here, the resistivity ρ2 of the material for the lead parts 88*a*, 88*b* is lower than the resistivity ρ1 of the material for the heating part 81. Such a thin-film magnetic head 10C can easily be obtained by providing the portions of the common layer 99 corresponding to the base parts 82*a*, 82*b* with a layer of a material different from that of the common layer 99 in the process of making the thin-film magnetic head 10.

The sheet resistance SR3 of the lead parts 88*a*, 88*b* is lower than the sheet resistance SR1 of the heating part 81 in the three thin-film magnetic heads 10A to 10C as well. Therefore, operations and effects similar to those in the thin-film magnetic head 10 can be obtained.

In particular, the thin-film magnetic head 10B can lower its manufacturing cost and is easier to make, since the number of kinds of materials constituting the heater 80 is smaller.

In particular, the thin-film magnetic head 10C can be made smaller with an increased degree of freedom in terms of where to place the heater 80, since the heater 80 can be made thinner.

Figure 13:
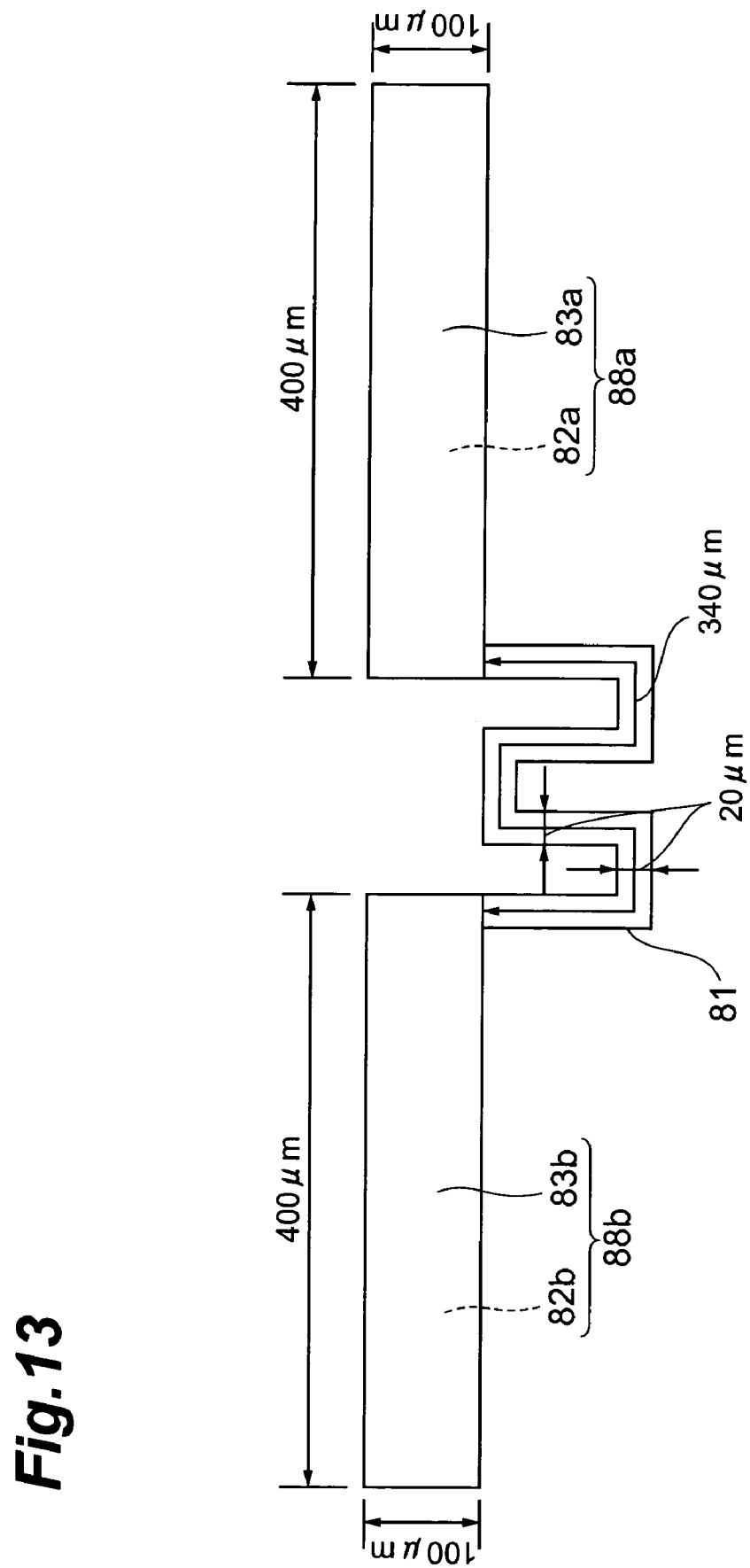
FIG. 13 is a plan view showing the heater in accordance with Example 1.
Figure 14:
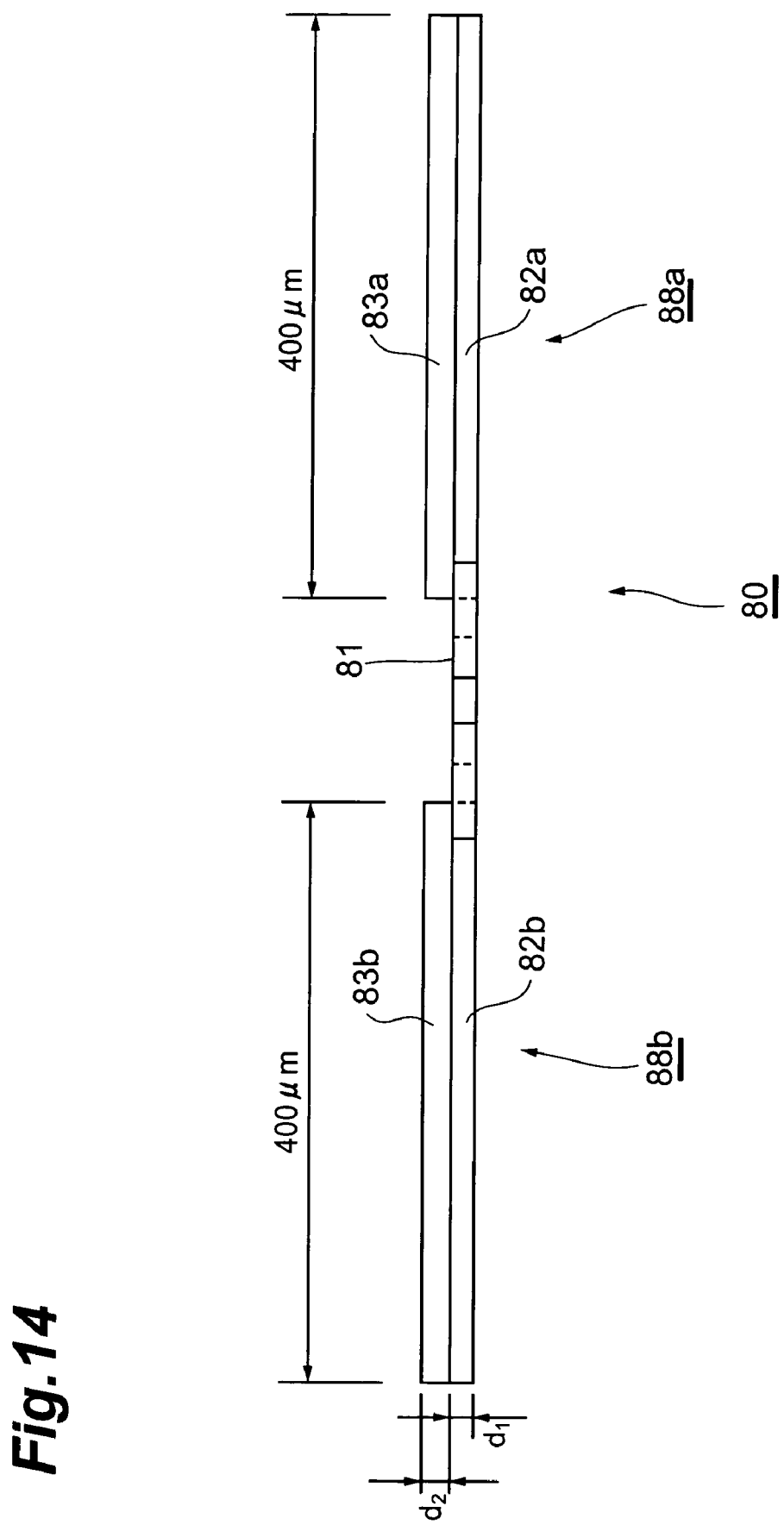
FIG. 14 is a side view of the heater shown in FIG. 13.

The fact that the thin-film magnetic head in accordance with this embodiment allows the heating of the heater 80 to concentrate at the heating part 81 will now be illustrated specifically with reference to Examples and Comparative Examples. Here, the power consumption in the heating part 81 in the total power consumption of the heater 80 comprising the heating part 81 and lead parts 88a, 88b respectively disposed on both ends of the heating part 81 as shown in FIGS. 13 and 14 was determined by a calculation.

The heating part 81 of the heater 80 is a winding conductive path made of a single material with a width of 20 μm×a total length of 340 μm×a thickness d1. The lead parts 88a, 88b include base parts 82a, 82b with a thickness d1 made of the same material as with the heating part 81, and additional conductive layers 83a, 83b with a thickness d2 laminated on the base parts 82a, 82b. Each of the lead parts 88a, 88b is a conductive path with a width of 100 μm×a length of 400 μm×a thickness (d1+d2).

In Comparative Example 1, NiFe (having a resistivity of 23 μΩ·cm) with a thickness of 150 nm was used as the material for the heating part 81 and base parts 82a, 82b of the heater 80 without providing the additional conductive layers 83a, 83b. In this case, the sheet resistance of the lead parts 88a, 88b was 1.53 Ω. The resistance of the heating part 81 was 26.1 Ω, whereas the sum of the lead parts 88a and 88b (hereinafter referred to as the total resistance of lead parts) was 12.3 Ω, whereby the ratio of the resistance of the heating part 81 to the sum of the total resistance of lead parts and the resistance of the heating part 81, i.e., the power consumption of the heating part 81 in the total power consumption of the heater 80, was 68.0%.

On the other hand, Example 1 was the same as Comparative Example 1 except that NiFe was provided with a thickness of 100 nm as the additional conductive layers 83a, 83b, whereas Example 2 was the same as Comparative Example 1 except that NiFe was provided with a thickness of 200 nm as the additional conductive layers 83a, 83b. In Examples 1 and 2, the sheet resistance in the additional conductive layers 83a, 83b was 2.30 Ω and 1.15 Ω, respectively, the sheet resistance of the lead parts was 0.92 Ω and 0.66 Ω, respectively, the resistance of the heating part 81 was 26.1 Ω each, the total resistance of the lead parts was 7.4 Ω and 5.3 Ω, respectively, and the power consumption of the heating part 81 in the total power consumption of the heater 80 was 78.0% and 83.2%, respectively.

Examples 3 to 8 were the same as Example 1 except that CoFe (having a resistivity of 20 μΩ·cm) was provided with respective thicknesses of 93 nm, 100 nm, 108.5 nm, 131 nm, 162 nm, and 200 nm as the additional conductive layers 83a, 83b. In Examples 3 to 8, the sheet resistance of the additional conductive layers 83a, 83b was 2.15 Ω, 2.00 Ω, 1.84 Ω. 1.53 Ω, 1.23 Ω, and 1.00 Ω, respectively, the sheet resistance of the lead parts was 0.90 Ω, 0.87 Ω, 0.84 Ω, 0.77 Ω, 0.68 Ω, and 0.61 Ω, respectively, the resistance of the heating part 81 was 26.1 Ω each, the total resistance of the lead parts was 7.2 Ω, 6.9 Ω, 6.7 Ω, 6.1 Ω, 5.5 Ω, and 4.8 Ω, respectively, and the power consumption of the heating part 81 in the total power consumption of the heater 80 was 78.4%, 79.0%, 79.6%, 81.0%, 82.7%, and 84.3%, respectively.

Examples 9 to 12 were the same as Example 1 except that Mo (having a resistivity of 16.0 μΩ·cm) was provided with respective thicknesses of 100 nm, 173 nm, 200 nm, and 255 nm as the additional conductive layers 83a, 83b. In Examples 9 to 12, the sheet resistance of the additional conductive layers 83a, 83b was 1.60 Ω, 0.92 Ω, 0.80 Ω, and 0.63 Ω, respectively, the sheet resistance of the lead parts was 0.78 Ω, 0.58 Ω, 0.53 Ω, and 0.45 Ω, respectively, the resistance of the heating part 81 was 26.1 Ω each, the total resistance of the lead parts was 6.3 Ω, 4.6 Ω, 4.2 Ω, and 3.6 Ω, respectively, and the power consumption of the heating part 81 in the total power consumption of the heater 80 was 80.6%, 85.0%, 86.1%, and 88.0%, respectively.

Examples 13 and 14 were the same as Example 1 except that Rh (having a resistivity of 17.5 μΩ·cm) was provided with respective thicknesses of 100 nm and 200 nm as the additional conductive layers 83a, 83b. In Examples 13 and 14, the sheet resistance of the additional conductive layers 83a, 83b was 1.75 Ω and 0.88 Ω, respectively, the sheet resistance of the lead parts was 0.82 Ω and 0.56 Ω, respectively, the resistance of the heating part 81 was 26.1 Ω each, the total resistance of the lead parts was 6.5 Ω and 4.5 Ω, respectively, and the power consumption of the heating part 81 in the total power consumption of the heater 80 was 79.9% and 85.4%, respectively.

Examples 15 and 16 were the same as Example 1 except that Au (having a resistivity of 3.5 μΩ·cm) was provided with respective thicknesses of 100 nm and 200 nm as the additional conductive layers 83a, 83b. In Examples 15 and 16, the sheet resistance of the additional conductive layers 83a, 83b was 0.35 Ω and 0.18 Ω, respectively, the sheet resistance of the lead parts was 0.28 Ω and 0.16 Ω, respectively, the resistance of the heating part 81 was 26.1 Ω each, the total resistance of the lead parts was 2.3 Ω and 1.3 Ω, respectively, and the power consumption of the heating part 81 in the total power consumption of the heater 80 was 92.0% and 95.4%, respectively.

Examples 17 and 18 were the same as Example 1 except that Cu (having a resistivity of 3.0 μΩ·cm) was provided with respective thicknesses of 100 nm and 200 nm as the additional conductive layers 83a, 83b. In Examples 17 and 18, the sheet resistance of the additional conductive layers 83a, 83b was 0.30 Ω and 0.15 Ω, respectively, the sheet resistance of the lead parts was 0.25 Ω and 0.14 Ω, respectively, the resistance of the heating part 81 was 26.1 Ω each, the total resistance of the lead parts was 2.0 Ω and 1.1 Ω, respectively, and the power consumption of the heating part 81 in the total power consumption of the heater 80 was 92.9% and 96.0%, respectively. The foregoing results are shown in FIG. 15.

By contrast, Comparative Example 2 was a case where CoFe (having a resistivity of 20 μΩ·cm) with a thickness of 150 nm was used as the material for the heating part 81 and base parts 82a, 82b of the heater 80 without providing the additional conductive layers 83a, 83b. In this case, the sheet resistance of the lead parts 88a, 88b was 1.33 Ω. The resistance of the heating part was 22.7 Ω, whereas the total resistance of lead parts was 10.7 Ω, whereby the power consumption of the heating part 81 in the total power consumption of the heater 80 was 68.0%.

On the other hand, Examples 19 to 23 were the same as Comparative Example 2 except that CoFe (having a resistivity of 20 μΩ·cm), Rh (having a resistivity of 17.5 μΩ·cm), Mo (having a resistivity of 16.0 μΩ·cm), Au (having a resistivity of 3.5 μΩ·cm), and Cu (having a resistivity of 3.0 μΩ·cm) were provided as the additional conductive layers 83a, 83b, respectively, each with a thickness of 100 nm. In Examples 19 to 23, the sheet resistance of the additional conductive layers 83a, 83b was 2.00 Ω, 1.75 Ω, 1.60 Ω, 0.35 Ω, and 0.30 Ω, respectively, the sheet resistance of the lead parts was 0.80 Ω, 0.76 Ω, 0.73 Ω, 0.28 Ω, and 0.24 Ω, respectively, the resistance of the heating part 81 was 22.7 Ω each, the total resistance of the lead parts was 6.4 Ω, 6.1 Ω, 5.8 Ω, 2.2 Ω, and 2.0 Ω, respectively, and the power consumption of the heating part 81 in the total power consumption of the heater 80 was 78.0%, 78.9%, 79.6%, 91.1%, and 92.0%, respectively. The foregoing results are shown in FIG. 16.

As can be seen from the foregoing, it is easily understood that the ratio of the power consumption of the heating part 81 to the total power consumption of the heating part 81 can easily be increased if the sheet resistance of the lead parts 88a, 88b is made lower than that of the heating part 81 by providing the additional conductive layers 83a, 83b onto the base parts 82a, 82b. As the sheet resistance SR3 of the lead parts 88a, 88b is made lower than the sheet resistance SR1 of the heating part 81, the ratio of the power consumption of the heating part 81 to the total power consumption of the heater 80 increases. Also, as the sheet resistance SR2 of the additional conductive layers 83a, 83b is made lower, the sheet resistance SR2 of the additional conductive layers 88a, 88b decreases, whereby the ratio of the power consumption of the heating part 81 to the total power consumption of the heater 80 increases. In particular, as can be seen from Examples 2, 7, 8, 10 to 12, 14 to 18, 22, and 23, it will be effective if the sheet resistance SR2 of the additional conductive layers 83a, 83b is made lower than the sheet resistance SR1 of the base parts 82a, 82b, i.e., (SR2/SR1) <1.0, since the power consumption in the heating part 81 can attain a ratio of 82% or higher.

Though the present invention has been explained in detail with reference to the above embodiment, the invention should not be limited to this embodiment.

For example, without being restricted to the above-mentioned embodiment, the heater 80 can be disposed at any position, e.g., in the undercoat layer 113 or insulating layer 72. Also, two or more heaters 80 may be provided. The distance from the ABS 17 to the heater 80 is not limited. Modes of the heating part 81 and lead parts 88a, 88b in the heater 80 are not restricted to those mentioned above. The heater 80 extends farther in the direction substantially perpendicular to the ABS 17 than it does in the direction substantially parallel to the ABS 17 in the above embodiment; however, configurations not satisfying this condition may be adopted, such as the configuration in which the ABS 17 extends vertically in FIG. 4 and perpendicularly to the paper surface of FIG. 4 so as to be located on the left side of the heater 80 in FIG. 4.

Modes of the heating part 81 and lead parts 88a, 88b in the heater 80 are not restricted to the above-mentioned embodiment and modified examples as long as the sheet resistance of lead parts is lower than that of the heating part.

Depending on the amount of the current fed through the heater 80 or the like, the heating layer 80 may be covered with a shield layer containing soft magnetic material. This can prevent magnetic field leakage from the heater 80, if any, from adversely affecting the recording head part 60 and reproducing head part 30.

In the reproducing head part 30, MR devices such as CPP (Current Perpendicular to Plane)-GMR devices, AMR (Anisotropic MagnetoResistive) devices utilizing anisotropic magnetoresistive effect, and TMR (Tunneling MagnetoResistive) devices utilizing magnetoresistive effect occurring at tunneling junctions may also be utilized in place of the above-mentioned GMR device 40. The thin-film magnetic head may be of perpendicular recording type instead of longitudinal recording type.

Though the thin-film magnetic head 10 including the recording head part 60 and GMR device 40 is disposed at one end part of the track width orthogonal to the track line in the loading end part of the slider 11 in FIG. 2, it may be disposed at the other end part or at the center part of the track width, as long as the thin-film magnetic head 10 is disposed at a position facing the ABS 17 in the slider 11.

Though the heater pads 86a, 86b are disposed so as to be held between the recording pads 18a, 18b and reproducing pads 19a, 19b in FIG. 2, they can be in any arrangement.

Though both of the GMR device 40 and recording head part 60 are provided in the thin-film magnetic head of the above-mentioned embodiment, either one of them may be provided alone.

Though the thickness of the lead parts 88a, 88b is the same as that of the heating part 81 in the thin-film magnetic head 10C (see FIG. 12), materials for the heating part 81 and lead parts 88a, 88b may be selected appropriately, so that the sheet resistance of the lead parts 88a, 88b can become lower than that of the heating part 81 while making the lead parts 88a, 88b thinner than the heating part 81.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A thin-film magnetic head comprising:
    at least either an electromagnetic transducer or a magnetoresistive device; and
    a sheet-shaped heater for generating heat when energized, the heater having a heating part with a predetermined sheet resistance and a lead part which is connected in series to the heating part and has a sheet resistance lower than that of the heating part,
    wherein the heating part and the lead part include an electrically conductive common layer extending from the lead part to the heating part, and the lead part further includes an electrically conductive additional layer provided in contact with the common layer.

2. The thin-film magnetic head according to claim 1, wherein the heating part is formed in a strip having opposite ends, and
    wherein the heater further comprises a lead part which is connected in series to the heating part and has a sheet resistance lower than that of the heating part, the lead parts are respectively connected to the opposite ends of the heating part.

3. A thin-film magnetic head according to claim 1, wherein the additional layer has a sheet resistance lower than that of the common layer.

4. A thin-film magnetic head according to claim 1, wherein the additional conductive layer contains at least one of Cu, Au, Ni, Co, Ta, W, Mo, Rh, and alloys thereof.

5. A thin-film magnetic head according to claim 1, wherein the lead part and the heating part are made of the same material, the lead part having a thickness greater than that of the heating part.

6. The thin-film magnetic head according to claim 1, wherein at least one of the lead and heating parts is formed by sputtering.

7. The thin-film magnetic head according to claim 1, wherein the heater thermally expands when energized to cause the electromagnetic transducer or magnetoresistive device to project.

8. A hard disk drive comprising:
a support;
a thin-film magnetic head formed on the support; and
a recording medium opposing the thin-film magnetic head,
wherein the thin-film magnetic head having at least either an electromagnetic transducer or a magnetoresistive device, and a sheet-shaped heater for generating heat when energized, the heater including a heating part with a predetermined sheet resistance and a lead part which is connected in series to the heating part and has a sheet resistance lower than that of the heating part; and
wherein the heating part is shaped in a strip winding in a rectangular wave pattern.

9. A thin-film magnetic head comprising:
at least either an electromagnetic transducer or a magnetoresistive device; and
a sheet-shaped heater for generating heat when energized, the heater having a heating part with a predetermined sheet resistance and a lead part which is connected in series to the heating part and has a sheet resistance lower than that of the heating part,
wherein the heating part is shaped in a strip winding in a rectangular wave pattern.

10. A head gimbal assembly comprising:
a support;
a thin-film magnetic head formed on the support; and
a gimbal for securing the support,
wherein the thin-film magnetic head has at least either an electromagnetic transducer or a magnetoresistive device, and a sheet-shaped heater for generating heat when energized, the heater including a heating part with a predetermined sheet resistance and a lead part which is connected in series to the heating part and has a sheet resistance lower than that of the heating part; and
wherein the heating part and the lead part include an electrically conductive common layer extending from the lead part to the heating part, and the lead part further includes an electrically conductive additional layer provided in contact with the common layer.

11. A hard disk drive comprising:
a support;
a thin-film magnetic head formed on the support; and
a recording medium opposing the thin-film magnetic head,
wherein the thin-film magnetic head has at least either an electromagnetic transducer or a magnetoresistive device, and a sheet-shaped heater for generating heat when energized, the heater including a heating part with a predetermined sheet resistance and a lead part which is connected in series to the heating part and has a sheet resistance lower than that of the heating part; and
wherein the heating part and the lead part include an electrically conductive common layer extending from the lead part to the heating part, and the lead part further includes an electrically conductive additional layer provided in contact with the common layer.

12. A hard disk drive according to claim 11, wherein the heater thermally expands when energized to cause the electromagnetic transducer or magnetoresistive device to project so that a distance between the recording medium and the electromagnetic transducer or magnetoresistive device is reduced.

13. A head gimbal assembly comprising:
a support;
a thin-film magnetic head formed on the support; and
a gimbal for securing the support,
wherein the thin-film magnetic head has at least either an electromagnetic transducer or a magnetoresistive device, and a sheet-shaped heater for generating heat when energized, the heater including a heating part with a predetermined sheet resistance and a lead part which is connected in series to the heating part and has a sheet resistance lower than that of the heating part; and
wherein the heating part is shaped in a strip winding in a rectangular wave pattern.

* * * * *